(12) United States Patent  
Outerbridge

(10) Patent No.: US 9,336,512 B2  
(45) Date of Patent: May 10, 2016

(54) DIGITAL MEDIA AND SOCIAL NETWORKING SYSTEM AND METHOD

(76) Inventor: Glenn Outerbridge, Houston, TX (US)

( * ) Notice: Subject to any disclaimer, the term of this patent is extended or adjusted under 35 U.S.C. 154(b) by 0 days.

(21) Appl. No.: 13/371,424

(22) Filed: Feb. 11, 2012

(65) Prior Publication Data

US 2012/0209902 A1  Aug. 16, 2012

Related U.S. Application Data

(60) Provisional application No. 61/441,728, filed on Feb. 11, 2011.

(51) Int. Cl.
| | |
|---|---|
| G06Q 10/10 | (2012.01) |
| H04L 29/08 | (2006.01) |
| H04N 21/84 | (2011.01) |
| G06Q 50/00 | (2012.01) |

(52) U.S. Cl.
CPC ............ *G06Q 10/101* (2013.01); *G06Q 10/107* (2013.01); *G06Q 50/01* (2013.01); *H04L 67/2823* (2013.01); *H04N 21/84* (2013.01)

(58) Field of Classification Search
None
See application file for complete search history.

(56) References Cited

U.S. PATENT DOCUMENTS

| | | | |
|---|---|---|---|
| 7,725,492 B2 | 5/2010 | Sittig et al. | |
| 8,027,943 B2 | 9/2011 | Juan et al. | |
| 8,086,662 B1 | 12/2011 | Doyle et al. | |
| 8,239,578 B2 * | 8/2012 | Denoual et al. | ............... 709/247 |
| 2003/0079047 A1 * | 4/2003 | Fitts et al. | ..................... 709/310 |
| 2004/0176944 A1 * | 9/2004 | Noda et al. | ......................... 704/3 |
| 2004/0176976 A1 * | 9/2004 | Boughannam | .................... 705/1 |
| 2005/0198304 A1 * | 9/2005 | Oliver et al. | .................. 709/227 |
| 2005/0237567 A1 * | 10/2005 | Morris | ........................ 358/1.15 |
| 2007/0061018 A1 * | 3/2007 | Callaghan | ............. G05B 19/05 700/1 |
| 2007/0099637 A1 * | 5/2007 | Mangla et al. | ................ 455/466 |
| 2008/0109532 A1 * | 5/2008 | Denoual | ................ H04L 12/58 709/219 |
| 2009/0049373 A1 * | 2/2009 | Sharma et al. | ................ 715/234 |
| 2009/0058822 A1 * | 3/2009 | Chaudhri | ...................... 345/173 |
| 2011/0066940 A1 * | 3/2011 | Asghari Kamrani et al. | . 715/716 |
| 2011/0072107 A1 * | 3/2011 | Gutta et al. | .................. 709/217 |

* cited by examiner

*Primary Examiner* — Ninos Donabed
(74) *Attorney, Agent, or Firm* — Greenberg Traurig, LLP

(57) ABSTRACT

Disclosed is computer implemented digital media systems and methods, including software application tools and related methods that employ a SOAP XML packet process or other software application or process to enable a user to embed, assemble and/or associate one or more digital elements (e.g., audio, video, or text), individually or collectively, with or within a digital element (e.g., an image), using a computer system such as a mobile, tablet or desktop device. For example, the disclosed photo application system and method empower users to automatically create a chronological timeline display of the user's photos uploaded into the system, to add text captions, voice, audio narration, and/or video clips that will play with a chronological slideshow. The disclosure provides a social networking application that allows users to uniquely create and share rich digital media content through applications, email, SMS/text, and transmission through interfaces with external applications.

13 Claims, 39 Drawing Sheets

Sample of Web Methods

- AddUserConnections
  Web method to Add user's connection.
- AuthenticateUser
- DeleteUserConnectionsByID
  Web method to delete user's connections. Multiple Connection IDs seperated by comma.
- GetUserConnectionsBySearchKeyword
  Web method to get user's connections list by keyword(First Name/Last Name/Email), ApprovalRequired : 1-Public, 0- Approval Required.
- GetUserConnectionsList
  Web method to get all user's connections list.
- GetUserConnectionsRequests
  Web method to get connection requests received from other eyeMe Users.
- GetUserLifeinPhotosByID
- GetUserMessagesCount
  Web method to Update the User Device Token, UDDI and mark it to send push notification, IsActive(0/1), IsPushNotifyAllowed(0/1))
- InviteFriends
  Web method to send invites to Users/Friends emails. Multiple email addresses can be used separated by comma
- PhotoTalkAdd
  Web method to save PhotoTalk data on eyeMe. ImageExtension : .jpg/.png, AudioExtension: .wav to .mp3, PhotoTalkDate : MM/DD/YYYY hh:mm:ss
- PhotoTalkDelete
  Web method to delete PhotoTalk data on eyeMe.PhotoTalkIDs(Multiple comma seperated PhotoTalk Message IDs)
- PhotoTalkMessageIsSentUpdate
  web Method to update the IsSent=1 for all the PhotTalk messages received. MessageIds: Comma seperated Message IDs
- PhotoTalksByUserID
  Web method to get user's phototalks list.
- PhotoTalksFromUserIDToUserID
  Web method to get user's phototalks list from User ID to other User ID.
- PhotoTalksReceived
  Web method to get user's PhotoTalks received(sent by other user).
- PhotoTalksUsersListMsgs
  Web method to get user's PhotoTalks User List with Last Sent message
- PushNotification
  Web method to Get the User Device Token, UDDI and IsActive(0/1), IsPushNotifyAllowed(0/1))
- QuickTalkMessageByFromToUserID
- QuickTalkMessageByFromToUserID_RecentMessage
- QuickTalkMessageByUserID
- QuickTalkMessageDeleteByID
  Web method to delete quickTalk Messages. MessageIds (Multiple comma seperated Message IDs )
- QuickTalkMessageIsSentUpdate
  web Method to update the IsSent=1 for all the messages received. MessageIds: Comma seperated Message IDs
- QuickTalkMessageSent
  Web method to send quickTalk Messages to multiple users, ToUserIDs (Multiple comma seperated User IDs )
- QuickTalkMessageUsersList
- SendUserConnectionsRequest
  Web method to send connection request to other users. Affiliation ='Individual', ConnectionType='Friend', inCircleId=0, inCircleText='No'
- UpdateUserConnectionRequest
  Web method to Approve/Reject connection request from other users. Confirmed=1 if wants to approve else 0, Rejected=1 if wants to reject else 0
- UserDeviceTokenUDDI_Add
  Web method to Save the User Device Token, UDDI and mark it to send push notification, IsActive(0/1), IsPushNotifyAllowed(0/1))
- UserDeviceTokenUDDI_Get
  Web method to Get the User Device Token, UDDI and IsActive(0/1), IsPushNotifyAllowed(0/1))
- UserDeviceTokenUDDI_Update
  Web method to Update the User Device Token, UDDI and mark it to send push notification, IsActive(0/1), IsPushNotifyAllowed(0/1))

FIG. 1-104C

PhotoTalkAdd

Web method to save PhotoTalk data on eyeMe. ImageExtension : .jpg/.png, AudioExtension: .wav to .mp3, PhotoTalkDate : MM/DD/YYYY hh:mm:ss

Test

The test form is only available for methods with primitive types as parameters.

SOAP 1.1

The following is a sample SOAP 1.1 request and response. The placeholders shown need to be replaced with actual values.

```
POST /eyeMeWebService.asmx HTTP/1.1
Host: review.eyeme.us
Content-Type: text/xml; charset=utf-8
Content-Length: length
SOAPAction: "http://www.eyeme.us/PhotoTalkAdd"

<?xml version="1.0" encoding="utf-8"?>
<soap:Envelope xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
  <soap:Body>
    <PhotoTalkAdd xmlns="http://www.eyeme.us/">
      <token>string</token>
      <FromUserId>string</FromUserId>
      <ToUserID>string</ToUserID>
      <PhotoTalktext>string</PhotoTalktext>
      <PhotoTalkImage>base64Binary</PhotoTalkImage>
      <ImageExtension>string</ImageExtension>
      <PhotoTalkAudio>base64Binary</PhotoTalkAudio>
      <AudioExtension>string</AudioExtension>
      <PhotoTalkDate>string</PhotoTalkDate>
    </PhotoTalkAdd>
  </soap:Body>
</soap:Envelope>
HTTP/1.1 200 OK
Content-Type: text/xml; charset=utf-8
Content-Length: length <?xml version="1.0" encoding="utf-8"?>
<soap:Envelope xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
  <soap:Body>
    <PhotoTalkAddResponse xmlns="http://www.eyeme.us/">
      <PhotoTalkAddResult>
        <ReturnObject />
        <Token>string</Token>
        <Status>string</Status>
        <Description>string</Description>
        <Code>string</Code>
      </PhotoTalkAddResult>
    </PhotoTalkAddResponse>
  </soap:Body>
</soap:Envelope>
```
SOAP 1.2 The following is a sample SOAP 1.2 request and response. The placeholders shown need to be replaced with actual values.

FIG. 1-104D

```
POST /eyeMeWebService.asmx HTTP/1.1
Host: review.eyeme.us
Content-Type: application/soap+xml; charset=utf-8
Content-Length: length <?xml version="1.0" encoding="utf-8"?>
<soap12:Envelope xmlns:xsi="http://www.w3.org/2001/XMLSchema-instance"
xmlns:xsd="http://www.w3.org/2001/XMLSchema"
xmlns:soap12="http://www.w3.org/2003/05/soap-envelope">
  <soap12:Body>
    <PhotoTalkAdd xmlns="http://www.eyeme.us/">
      <token>string</token>
      <FromUserId>string</FromUserId>
      <ToUserIDs>string</ToUserIDs>
      <PhotoTalktext>string</PhotoTalktext>
      <PhotoTalkImage>base64Binary</PhotoTalkImage>
      <ImageExtension>string</ImageExtension>
      <PhotoTalkAudio>base64Binary</PhotoTalkAudio>
      <AudioExtension>string</AudioExtension>
      <PhotoTalkDate>string</PhotoTalkDate>
    </PhotoTalkAdd>
  </soap12:Body>
</soap12:Envelope>
HTTP/1.1 200 OK
Content-Type: application/soap+xml; charset=utf-8
Content-Length: length <?xml version="1.0" encoding="utf-8"?>
<soap12:Envelope xmlns:xsi="http://www.w3.org/2001/XMLSchema-instance"
xmlns:xsd="http://www.w3.org/2001/XMLSchema"
xmlns:soap12="http://www.w3.org/2003/05/soap-envelope">
  <soap12:Body>
    <PhotoTalkAddResponse xmlns="http://www.eyeme.us/">
      <PhotoTalkAddResult>
        <ReturnObject />
        <Token>string</Token>
        <Status>string</Status>
        <Description>string</Description>
        <Code>string</Code>
      </PhotoTalkAddResult>
    </PhotoTalkAddResponse>
  </soap12:Body>
</soap12:Envelope>
```

FIG. 1-104D1

HTTP GET

The following is a sample HTTP GET request and response. The placeholders shown need to be replaced with actual values.

```
GET
/eyeMeWebService.asmx/PhotoTalkAdd?Token=string&FromUserID=string&ToUserIDs=string&PhotoT
alkText=string&PhotoTalkImage=string&PhotoTalkImage=string&ImageExtension=string&PhotoTal
kAudio=string&PhotoTalkAudio=string&AudioExtension=string&PhotoTalkDate=string HTTP/1.1
Host: review.eyeme.us
HTTP/1.1 200 OK
Content-Type: text/xml; charset=utf-8
Content-Length: length <?xml version="1.0" encoding="utf-8"?>
<wsResponseStatus xmlns="http://www.eyeme.us/">
    <ReturnObject />
    <Token>string</Token>
    <Status>string</Status>

<Description>string</Description>
    <Code>string</Code>
</wsResponseStatus>
```

HTTP POST

The following is a sample HTTP POST request and response. The placeholders shown need to be replaced with actual values.

```
POST /eyeMeWebService.asmx/PhotoTalkAdd HTTP/1.1
Host: review.eyeme.us
Content-Type: application/x-www-form-urlencoded
Content-Length: length Token=string&FromUserID=string&ToUserIDs=string&PhotoTalkText=string&PhotoTalkImage=strin
g&PhotoTalkImage=string&ImageExtension=string&PhotoTalkAudio=string&PhotoTalkAudio=string
&AudioExtension=string&PhotoTalkDate=string
HTTP/1.1 200 OK
Content-Type: text/xml; charset=utf-8
Content-Length: length <?xml version="1.0" encoding="utf-8"?>
<wsResponseStatus xmlns="http://www.eyeme.us/">
    <ReturnObject />
    <Token>string</Token>
    <Status>string</Status>
    <Description>string</Description>
    <Code>string</Code>
</wsResponseStatus>
```

FIG. 1-104D2

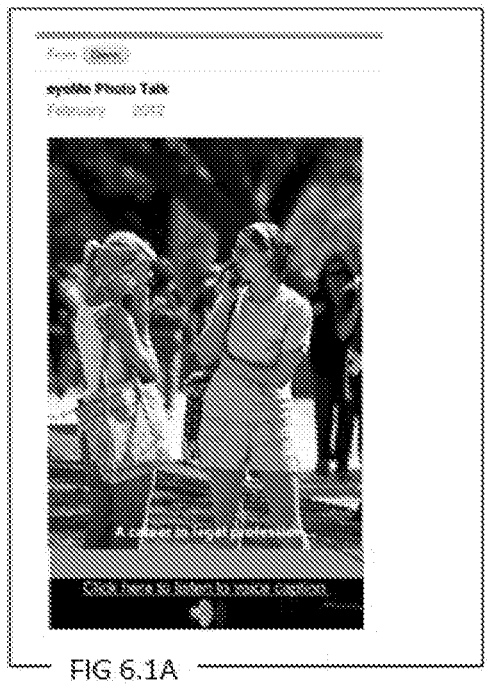
FIG 6.1A
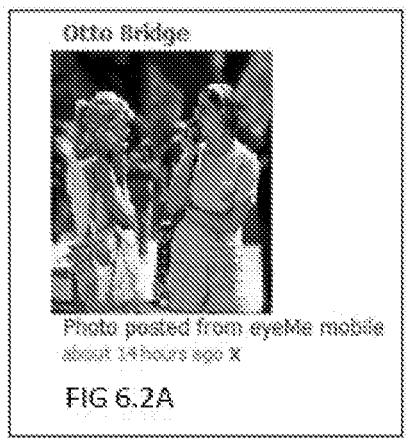
FIG 6.2A
FIG 6.3A

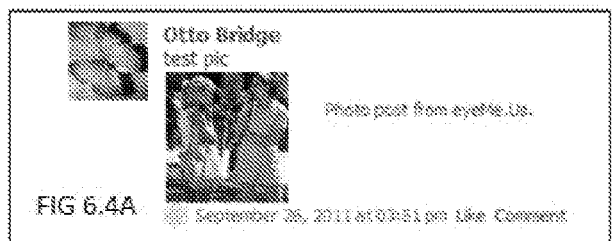
FIG 6.4A
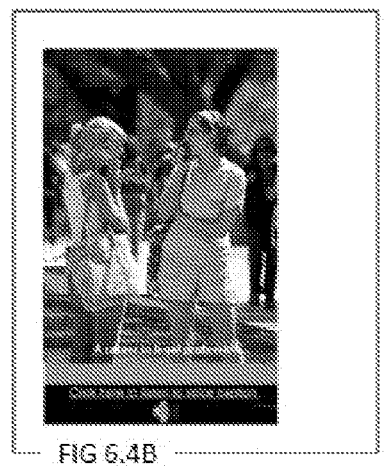
FIG 6.4B
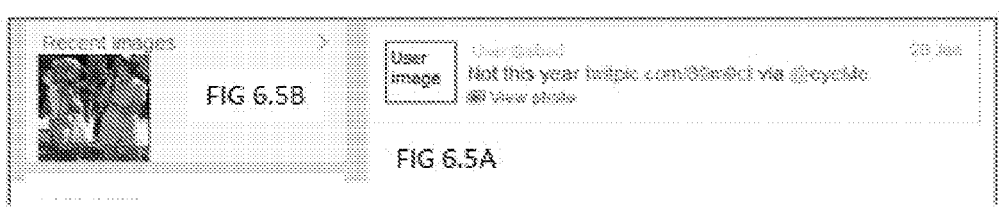
FIG 6.5B
FIG 6.5A
FIG 6.3B
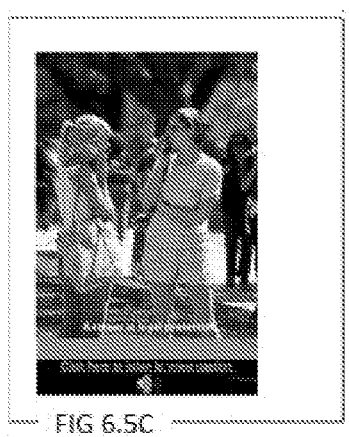
FIG 6.5C

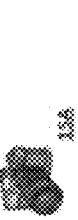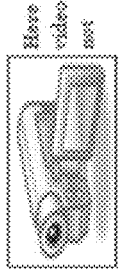
FIG. 15

FIG.27
FIG.28
FIG.29
FIG.30.1
FIG.30.2

| Registration Profile Type | Relatives | Friends | Members | Employees | Followers |
|---|---|---|---|---|---|
| Individual | X | X | N/A | N/A | X |
| On Behalf of Others | X | X | N/A | N/A | X |
| Family Group | X | X | N/A | N/A | X |
| Memorial Tribute | X | X | N/A | N/A | X |
| Religious Organizations (current or prior member) | N/A | N/A | X | X | X |
| Social Organizations (current or prior member) | N/A | N/A | X | X | X |
| Business (current or prior member) | N/A | N/A | N/A | X | X |
| Professional Sports Organizations (current or prior member) | N/A | N/A | X | X | X |

FIG. 35

| Description | Definition |
|---|---|
| Hide Me Privacy option | Your eyeMe contents will not show in the general search. Your profile and contents will be hidden from the general search. You will be able to share your contents with specific individuals. |

FIG. 36

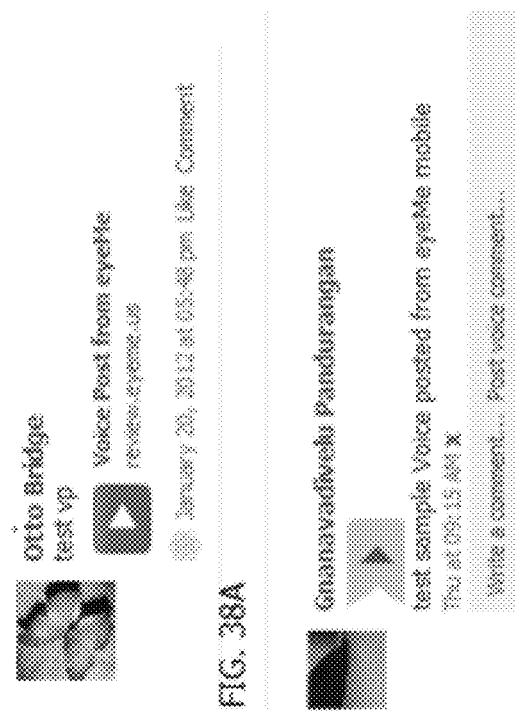
FIG. 38A
FIG. 38B
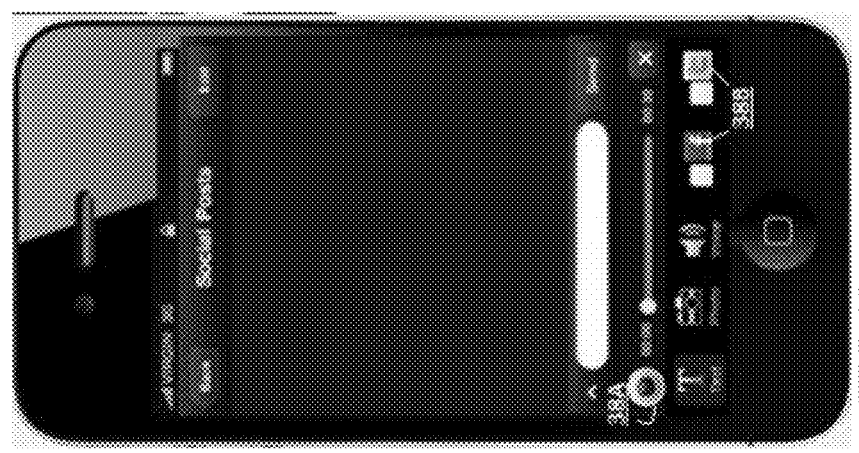
FIG. 38
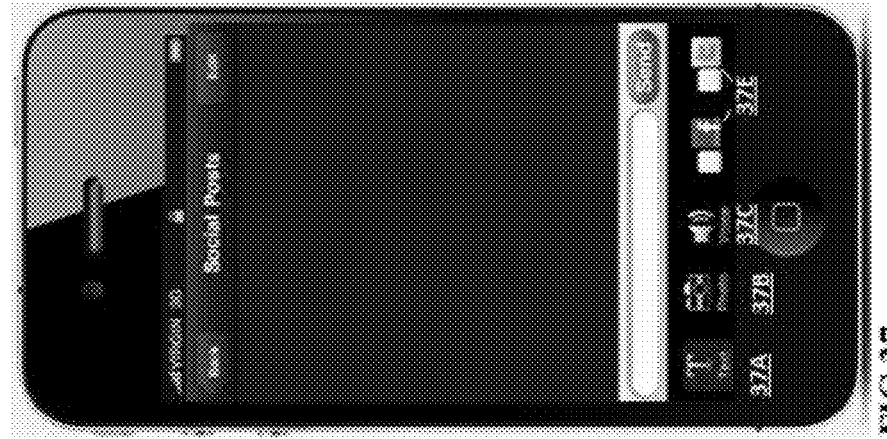
FIG. 37

FIG. 39 (continued)
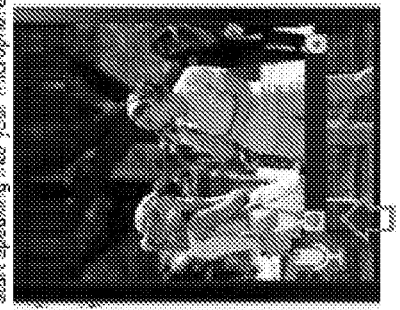
39D
39E
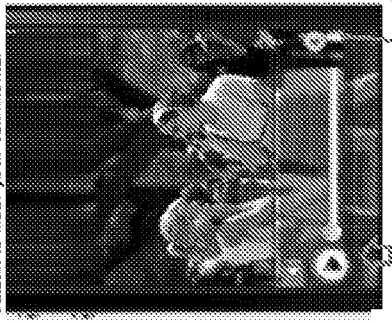
39F
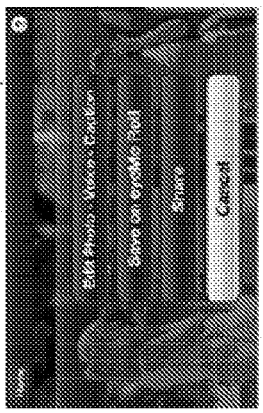
39G
39H
39I FIG. 39 (continued)
The user also has the option to select Add Text after taking a photo.
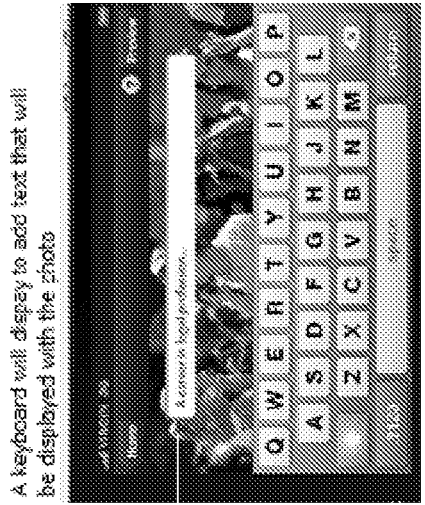

DIGITAL MEDIA AND SOCIAL NETWORKING SYSTEM AND METHOD

CROSS-REFERENCE TO RELATED APPLICATIONS

The present application claims the benefit of the Provisional U.S. Application Ser. No. 61/441,728 filed Feb. 11, 2011, entitled "SOCIAL NETWORKING SYSTEM AND METHOD," which is incorporate herein by reference.

FIELD OF THE INVENTION

The present invention relates to a computer implemented digital media and social media systems and methods for computer systems, such as mobile, tablet and desktop devices for the creation, display and communication of multimedia based digital content using voice, photo, image, and video methods and technologies.

BACKGROUND

The present invention relates generally to the creation and sharing of dynamic digital content in social media for networking purposes but is also useful for industrial and medical application uses also. Real-time social media tools have afforded users the opportunity to actively interact and share information about their activities and their lives. Embodiments of the invention provide new digital multimedia content for individuals and organizations to communicate and tell and share their stories through mobile, tablet and desktop devices over public or private networks.

SUMMARY

The present invention discloses computer implemented systems and method, including software application tools and related methods employ a SOAP XML packet process or other software application or process to enable a user to create or use a digital element, e.g., an image, including but not limited to a photo, web page, or other image, to embed, assemble and associate individually or collectively audio, video, or text (the latter which may be recognized and converted to audio with text recognition software tools) in the form of, e.g., a voice comment in the photo or other image using a computer system such as a mobile, tablet or desktop device. This pioneering and unique inventive system and method allows the user created content, e.g., the embedded voice to travel with images or other data file thereby allowing recipients who receive the photo, image or other data file to simply launch the dynamic content by simply click on it or otherwise causing the dynamic content to launch in order to listen and or view the dynamic content added to the photo, web page, other image, or data file received from the user. According to the present invention, text captions and other communicative features can also be embedded, assembled or associated and displayed with the photo, web page, or other image. The embedding, assembling, or associating of static or dynamic (multimedia) files such as photos, images, pages or other data files may be referred to herein as PhotoTalk. The reference to photos also refers to pictures or other images. The term images means any content that may be displayed. The system and method uses SOAP (XML) packets to assemble multimedia data that includes photos, recorded voice, video and text created and submitted to the social media network using the computer implement methods and systems software applications and services. It is not required to use hypertext or hypermedia processes to assemble or present the multimedia elements to users.

Embodiments of the present invention provides new digital media creation and sharing methods that expands the use of photos, voice, audio and video into a dynamic multi-media environment. The invention expands the use of digital media in social media, industrial and medical use. The methods include embedding recorded voice into digital media, such as photos that can be listened to by clicking on the photo or image. The computer implemented digital media and social media systems and methods for computer systems also include embedding audio and video into static digital pages, such as electronic books, thereby allowing a user to listen to and video viewed on or from the audio and/or video embedded page(s) without being directed to a separate screen or object. The digital contents created are compatible with all known or contemplated digital pages, web sites, text editors and e-Readers and can be viewed and played on mobile, tablet and desktop devices. The digital media content created according to embodiments of the invention become alive on the page(s) and turns the pages into digital viewing screens for photos and videos and a speaker for audio content.

The computer implemented systems and methods are particularly useful on social networks. One or more users may be in communication with a social network engine via a public or private network. The social network engine may comprise a social networking website, one or more servers operating the social networking website, or any other device or application capable of providing social networking services via the network. The users can access the services provided by the social network engine via the network. Optionally, one or more of the users may be able to access the social network engine directly.

The users may use a computing device, such as a laptop or desktop computer, a cellular telephone, a personal digital assistant (PDA), a set top box, and so forth to access the social network engine. The users can view and exchange data and files with and among the social network members, view a social timeline, enter data about themselves and possibly others, join social network groups, and so forth. The users are typically members of a social networking website associated with the social network engine, for example, and thus comprise the social network members.

According to exemplary embodiments, a user identifies one or more other members associated with the social network engine, with which the user wants to build a relationship or establish or alter the details of an existing relationship. Using the social network engine, the user enters the details about the relationship. The social network engine then sends data comprising the details from the user to the other users. The user and the other users may then provide input in response to the data. The response may, for example, modify the data or create new data including image, audio, video, text and other data files.

The relationship with the user and the other users may be confirmed, based on the input, by the social network engine. Alternatively, the existence of the relationship may be denied, according to some embodiments. Any type of confirmation and/or input may be utilized to alter, deny, and/or establish the relationship between the user and the other users.

The relationship may comprise any type of relationship that exists between two of the users. For example, the two users may be family members, attend the same place of worship, have worked together, been classmates, be related, have dated, and so forth. More than one relationship may exist between the two users. For example, the users may have the sample place of worship and be classmates.

The data may then be ordered. For example, a first user may specify that the relationship with a second user is older than the relationship with a third user. In other words, the first user may enter detailed data that indicates calendar dates, years, and other timing information about the relationship. The social network engine can then order the data by the indicated times and generate a social timeline based on the ordered data. The social timeline may indicate when certain events related to the relationships occurred, for example, such as in the year 2012, the first user met the second user and began attending the same place of worship. Any type of events, details, and other data related to the relationship may be provided by the users and utilized to generate the social timeline.

The social network engine may include a communications interface in association with the social network engine for receiving data from and sending data to the users. The users can send any type of data to the social network engine via the network and vice versa. For example, a user can provide details about relationships with other users that the social network engine can utilize to generate the social timeline for the user based on the details.

Typically, the users access a website associated with the social network engine. For example, the social network engine may host a social networking website where the users can visit to interact with one another. The website can display various types of data about the users to one another, such as the social timeline, profile information, or relationships a particular user may have with other users. The users may belong to particular communities within the social networking website, such as communities categorized according to school attended, workplace, geographical location, and so forth.

The social network engine can also generate and send communications to the users to transmit information about or information or other data associated with users between and among members of the social networking website. The social network engine may be utilized by the users to enter data about or otherwise desired to be transmitted to or be accessed by other users.

The social network engine can store the user provided information and data in databases in hard drives, on CD ROMS, in DRAM, and so forth. Any type of storage device or storage medium for storing information about or associated with the users is within the scope of various embodiments.

The same methods developed will allow individuals, Family Groups, Religious Organizations, Social Organizations, Businesses and Sports Organizations to easily create and share rich multimedia digital media content. These computer implement systems and methods according to the present invention involve a combination of text, photos, voice, audio and video that may be viewed in editable self-contained frames on digital pages. The digital pages are referred to herein as LivePage and may be viewed on computer systems such as mobile phones, tablet devises, cameras, video recorders, desktop/notebook/laptop computers, televisions, and networks. Viewers will be able to read text, view photos that contain voice comments, listen to recorded voice, listen to music, and play videos directly on the page or multiple pages, in the case of digital stories and books, giving the user a LivePage experience. LivePage refers to digital items becoming alive for the viewers, by way of example on viewable pages or through audio or video systems including computer systems.

A further aspect of an embodiment of the invention provides that a photo can be taken on a mobile device, e.g., camera, camera phone, etc., using an application timer that can be set by the user to delay the time within which a mobile devise camera will actually snap or otherwise take the photo. This invention allows users to take a photo hands-free so they can be part of a photo without the assistance of another individual.

A further aspect of an embodiment of the present invention allows users to uniquely create and share digital media content about their life experiences. The present invention provides a software application service that helps users easily create and share "their story" with current and future generations through social posts, which are by way of example referred to herein as My Life in Photos, My Story, My Inspiration and What's going on?. Using a combination of text, photos, voice, audio and video, users can share their user defined and created content, e.g., stories and legacies using the systems and methods of the invention's use on online social media networking.

A further aspect of an embodiment of the present invention provides users with the capability to create and share their chronological photo story on a digital timeline (Life in Photos) that includes photos with embedded voice and videos that play sequentially on the same digital slideshow, thereby allowing users to create and dynamically edit movies.

Additional aspects, objectives, features and advantages of the present invention will become apparent from the following description of the preferred embodiments with reference to the attached drawings.

BRIEF DESCRIPTION OF THE DRAWINGS

FIG. 1-104A is a block diagram of the invention web service Architecture

FIG. 1-104B is a block diagram of the invention SOAP packet structure

FIG. 1-104C is a sample listing of web methods and services used in 104A and 104B.

FIG. 1-104D is a sample of exemplary code according to one nonexclusive embodiment disclosed herein;

FIG. 1-104D1 is a sample of exemplary code according to one nonexclusive embodiment disclosed herein;

FIG. 1-104D2 is a sample of exemplary code according to one nonexclusive embodiment disclosed herein;

FIG. 2 is a block diagram of mobile features;

FIG. 6.1A illustrates an exemplary feature of the mobile application features associated with the PhotoTalk invention;

FIG. 6.2A illustrates an exemplary feature of the mobile application features associated with the PhotoTalk invention;

FIG. 6.3A illustrates an exemplary feature of the mobile application features associated with the PhotoTalk invention;

FIG. 6.3B illustrates an exemplary feature of the mobile application features associated with the PhotoTalk invention;

FIG. 6.4A illustrates an exemplary feature of the mobile application features associated with the PhotoTalk invention;

FIG. 6.4B illustrates an exemplary feature of the mobile application features associated with the PhotoTalk invention;

FIG. 6.5A illustrates an exemplary feature of the mobile application features associated with the PhotoTalk invention;

FIG. 6.5B illustrates an exemplary feature of the mobile application features associated with the PhotoTalk invention;

FIG. 6.5C illustrates an exemplary feature of the mobile application features associated with the PhotoTalk invention;

FIG. 15 illustrates a digital page with multimedia contents that are playable on the digital page;

FIG. 27 illustrates a photo added and sent in a digital message;

FIG. 28 illustrates the process and method 104 for selecting a photo to create a Photicon FIG. 29 illustrates the process and method 104 setting the properties and position of a Photicon for a digital message;

FIG. 30-1 illustrates the method in which a user selects a Photicon and auto text for a digital message;

FIG. 30-2 illustrates a Photicon sent in a digital message;

FIG. 35 is an illustration chart of registration user types;

FIG. 36 is an illustration chart that describes the Hide Me privacy setting.

FIG. 37 is an illustration of the present invention's Social Post 218 capabilities;

FIG. 38A is an illustration of a voice post to social-media site Facebook

FIG. 38B is an illustration of a voice post to social blogging site Twitter

FIG. 39 is an illustration of the step-by-step process to create and send a PhotoTalk (photo with voice embedded) from a user perspective.

DETAILED DESCRIPTION OF THE INVENTION

Figure 1:
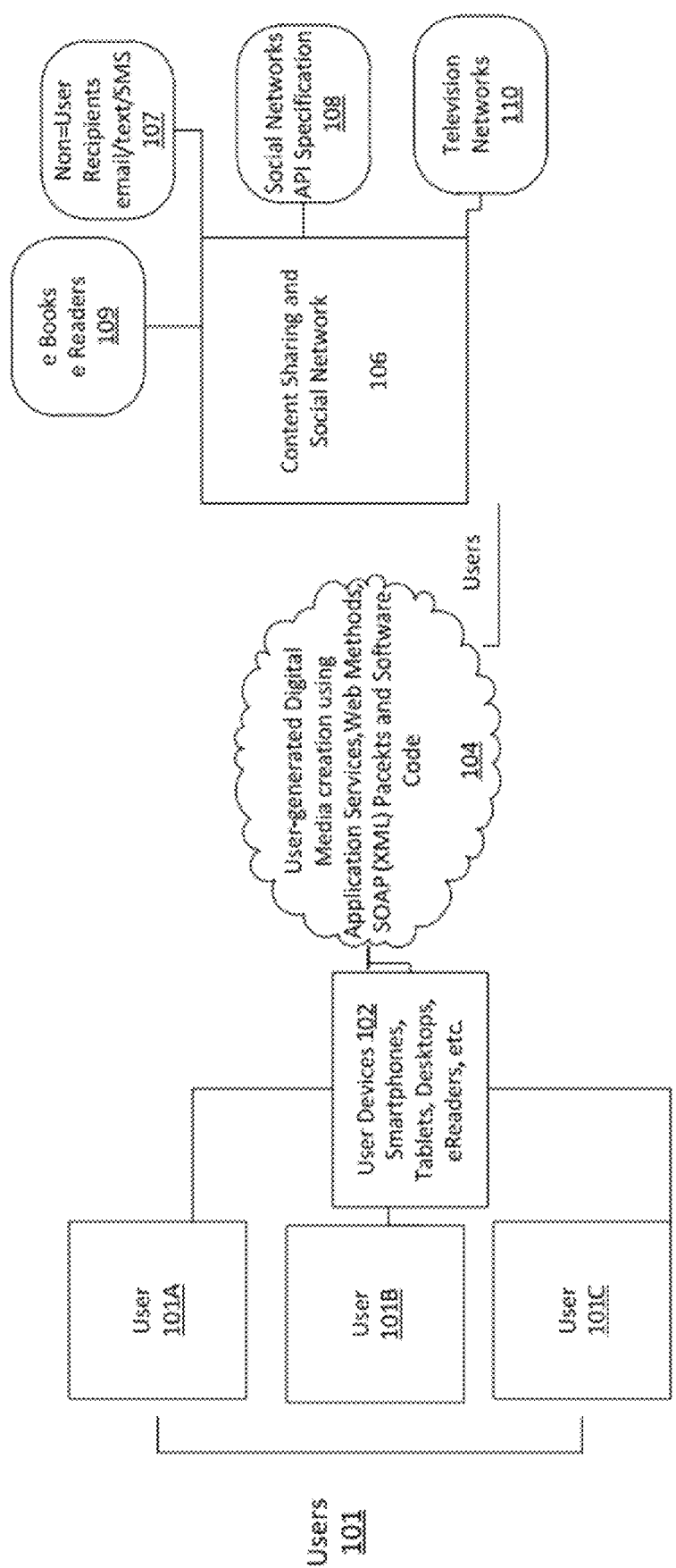
FIG. 1 is a block diagram of an example environment for digital media creation and sharing.
Figure 4:
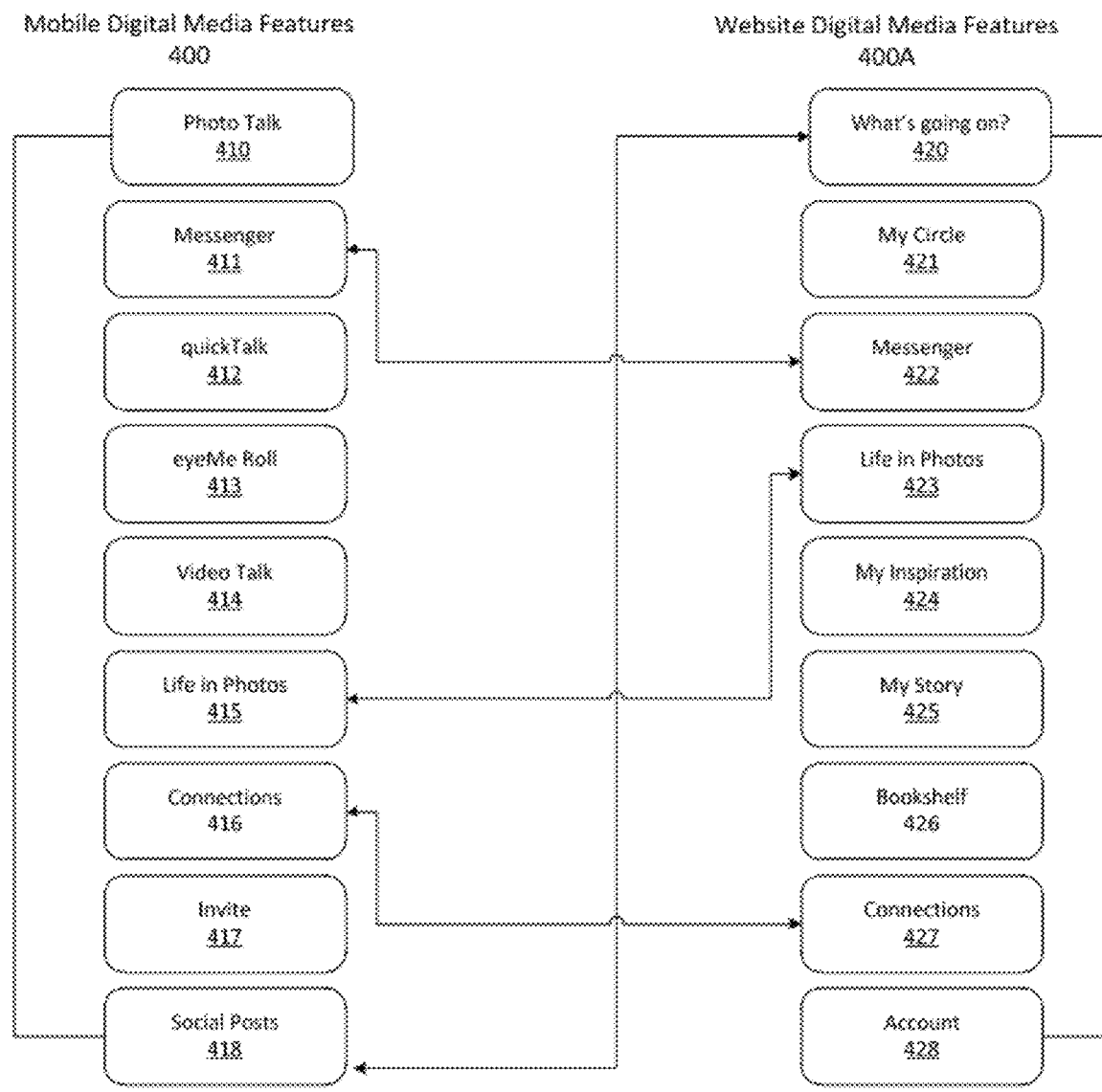
FIG. 4 is a block diagram of the relationship between mobile features FIG. 2 and web features FIG. 3.

FIG. 1 is a block diagram example of a digital media content creation and sharing environment where users 101 create and share multimedia digital content reflected in FIG. 4 with other users 101 as well as non-application users 107. Referencing FIG. 1 104, FIG. 1-104A-104C illustrates the specific process that has been developed to allow a multimedia element of voice to be embedded with photos is described here. The current invention provides a web-based content sharing and social network 106 consisting of servers, software application code, web methods and databases that maintain a structured hierarchy for text, photos, voice and video content created by users 101 on their devices 102. For the PhotoTalk invention FIG. 410 and FIGS. 6-601 When users 101 take photos and add voice or text to them through the invention applications 104, the data is transmitted to the network 106 and stored in a database structure within the network 106 in a manner in which it the web methods stores the photo, voice, text and video elements in a file structure that allows them to be retrieved and assembled as a SOAP (XML) packet FIG. 1-104B and presented upon authenticated requests back to a user on their devise 102 that allows the audio to be embedded with the photo and playable by the device 102 default audio player while still viewing the photo.

Figure 14:
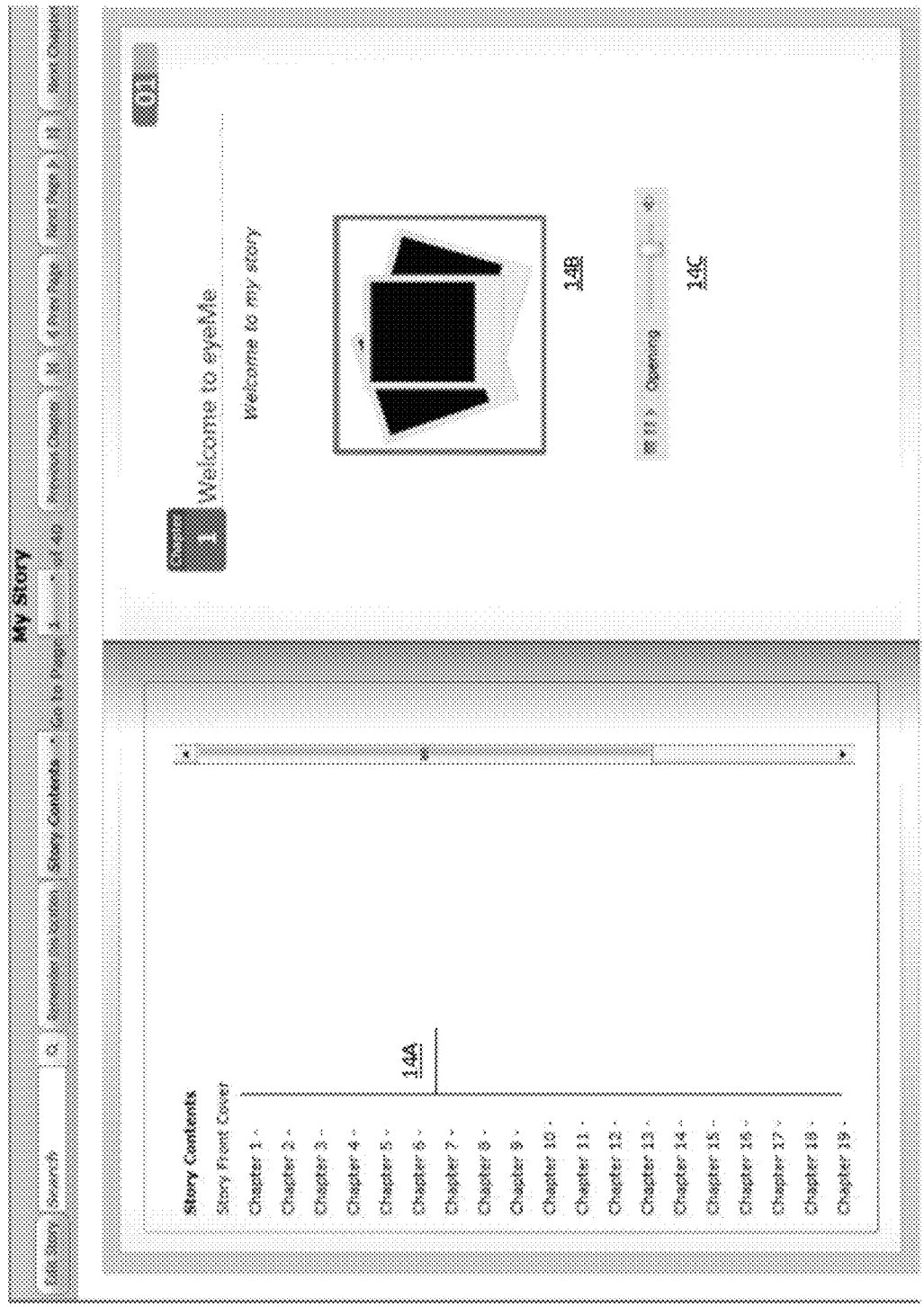
FIG. 14 illustrates an example of a digital story page and book.
Figure 16:
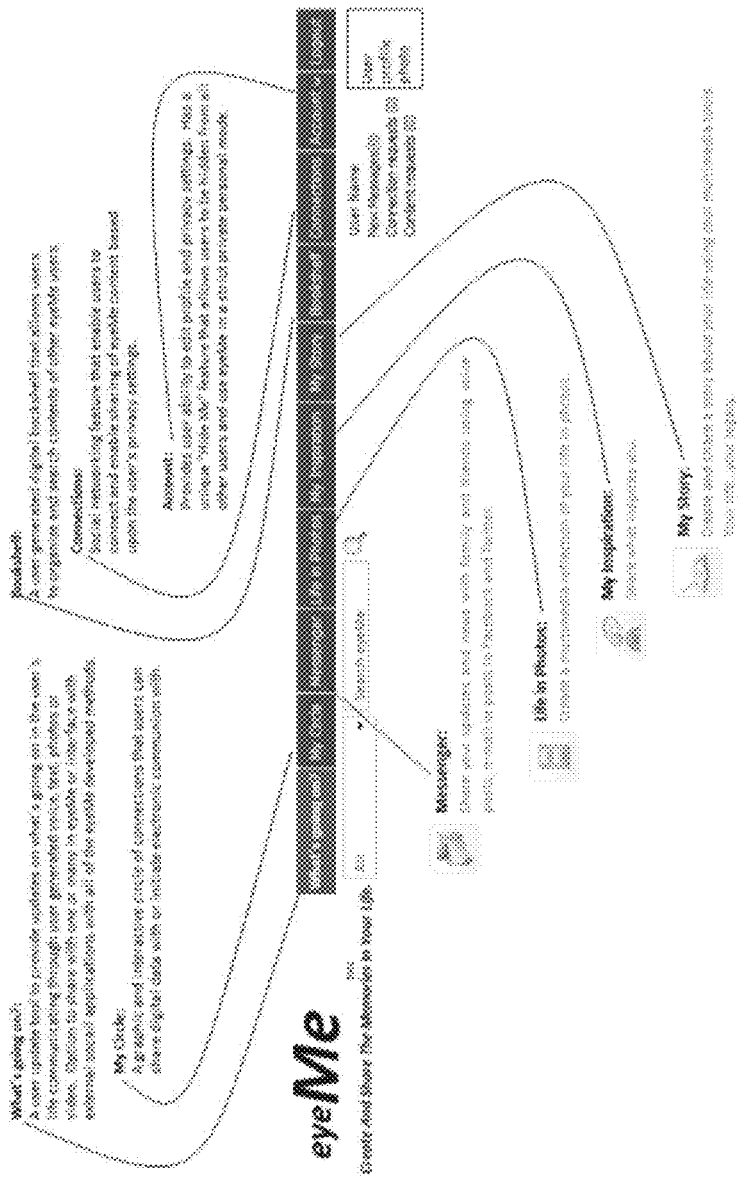
FIG. 16 illustrates the digital and social media features from example website.
Figure 17:
FIG. 17 illustrates the features from example mobile application.
Figure 18:
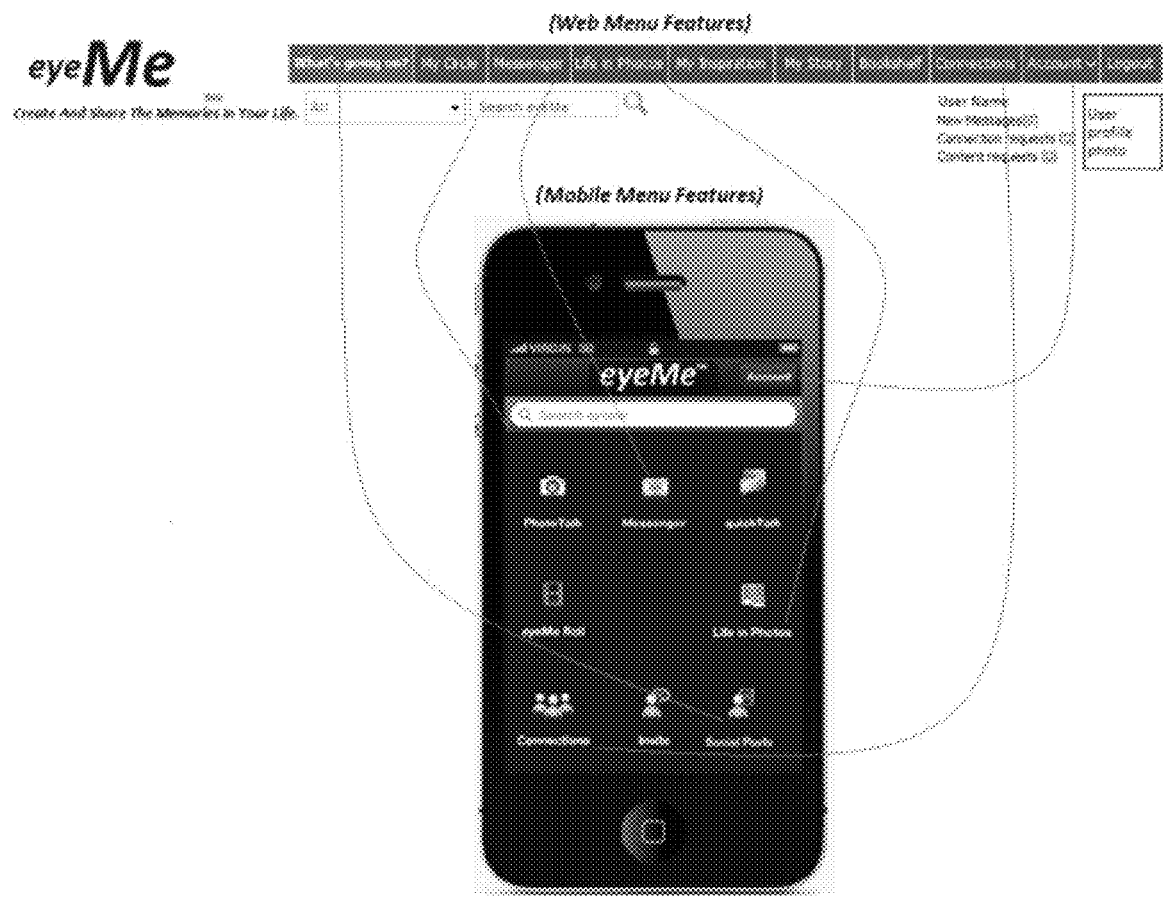
FIG. 18 illustrates the relationship between example mobile features FIG. 2 and example web features FIG. 3.

For the My Story invention FIG. 14 a database 104 hierarchy in the social network 106 is used to store text, photo, audio and video content created by users 101 on their devices 102. HTML code is used and the My Story eBook FIG. 14 reads the multimedia data from the file structure and assembles the data in a book viewer FIG. 14 using HTML code created to allow audio recorded or inserted by users to play on the page without opening a separate application and video recorded and inserted by users 101 to play on a digital page without opening a separate application or web page. An aspect of the invention provides digital and social-media software application methods and services 104 which help users 101 easily create and share new forms of digital media content on mobile and the web as reflected in FIG. 4 using devices 102. An aspect of the invention allows users 101 to take or use an existing photo, record and embed voice captions or messages using a mobile, tablet or desktop devices 102. The unique method that this aspect of the invention provides is the voice comment embedded in the photo using invention methods 104 travels with the photo so that users 101 or non-user recipients 107 simply click on the photo in a designated are to listen to the voice or audio. Text captions can also be embedded and displayed with the photos 801. The digital media content referenced in FIG. 102 and covered in more detail in FIG. 4 expands the digital content available for social networks, digital media, electronic books, electronic readers, and television networks. Although digital media content has been greatly associated with social networks 108, this invention introduces additional uses for industrial and medical uses in addition to social uses. For example, referring to FIG. 7 using the PhotoTalk invention users 101 can take a photo of a medical ailment with their device 102 record voice comments 701 about the photo and send it to a non-user 107 Physician to view the photo of the ailment and also simultaneously listen to the comments from the user 101 patient.

The internet represents a primary way in which users 101 socialize and stay in touch with family and friends. Therefore the internet provides a vast medium for interactions between vast numbers of people, businesses and organizations. Aspects of this invention provide new digital media content for mobile and tablet devices 102, social networks 108, eReaers 109 and television networks 110. Although the content sharing and social network aspects 106 of the invention can serve as a standalone social network, the primary benefit allows the digital media contents created using the application services and methods 104 to be interfaced with social networks 108, non-users 107, eReaders 109, television networks 110 and other internet sites and networks (public or private). The digital media content FIG. 4 can be transmitted via electronic mail, text or SMS 107.

Figure 2:
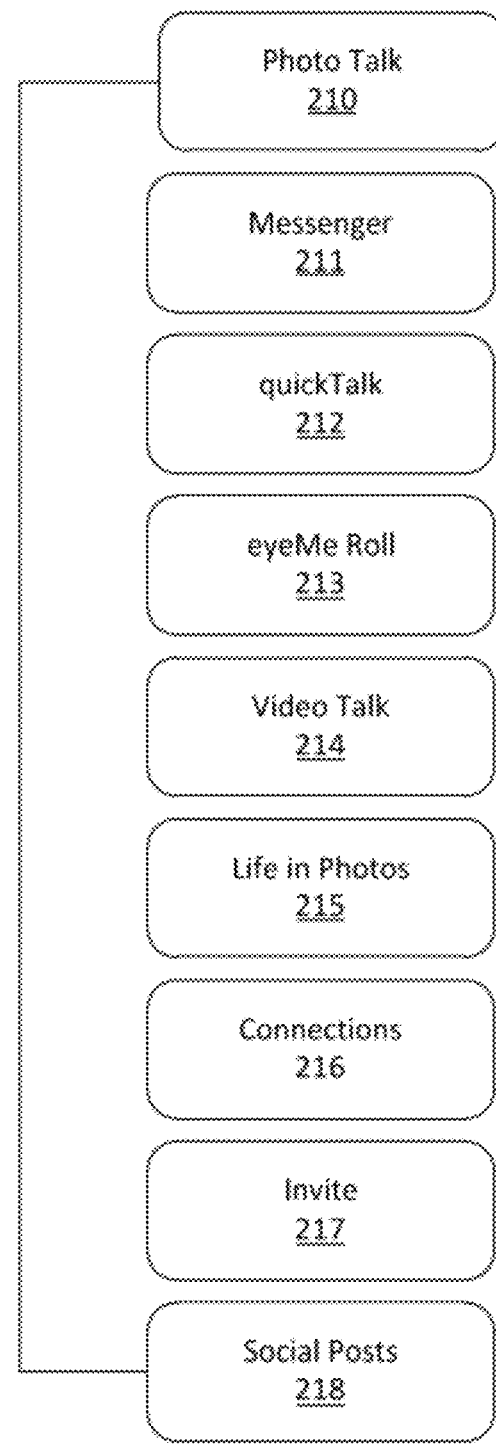
Figure 19:
FIG. 19 illustrates an example mobile device camera mode.
Figure 20:
FIG. 20 illustrates an example of recording a voice comment for a photo or video or text editor or social post or voice note.
Figure 21:
FIG. 21 illustrates an example of typing a text caption or message for a photo.
Figure 22:
FIG. 22 illustrates an example of a photo with embedded recorded voice and an embedded text caption.

Referring to FIG. 2, content creation and views on a mobile devise versus a desktop device is quite different and requires different features and views due to the amount of screen landscape available. FIG. 2 is a block diagram example of invention features available for use on mobile devices using application services and methods 104 that users 101 can interface with their devices 102 to create and share digital media contents with other users 101A, 101B, 101C, etc. The features referenced in 210 thru 218 are illustrated in further detail here:

210 The present invention discloses software application tools and methods 104 that enable a user to take or use an existing photo and record and embed a voice comment in the photo FIG. 19 by using a mobile, tablet or desktop device. This feature and process is named Photo Talk. The unique capability that this method provides is the embedded voice travels with the photo so that recipients simply click on a photo play button FIG. 22B to listen to the voice comments associated with the photo. Text captions FIG. 21 can also be embedded and displayed with the photos FIG. 22C.

Figures 1, 104A:
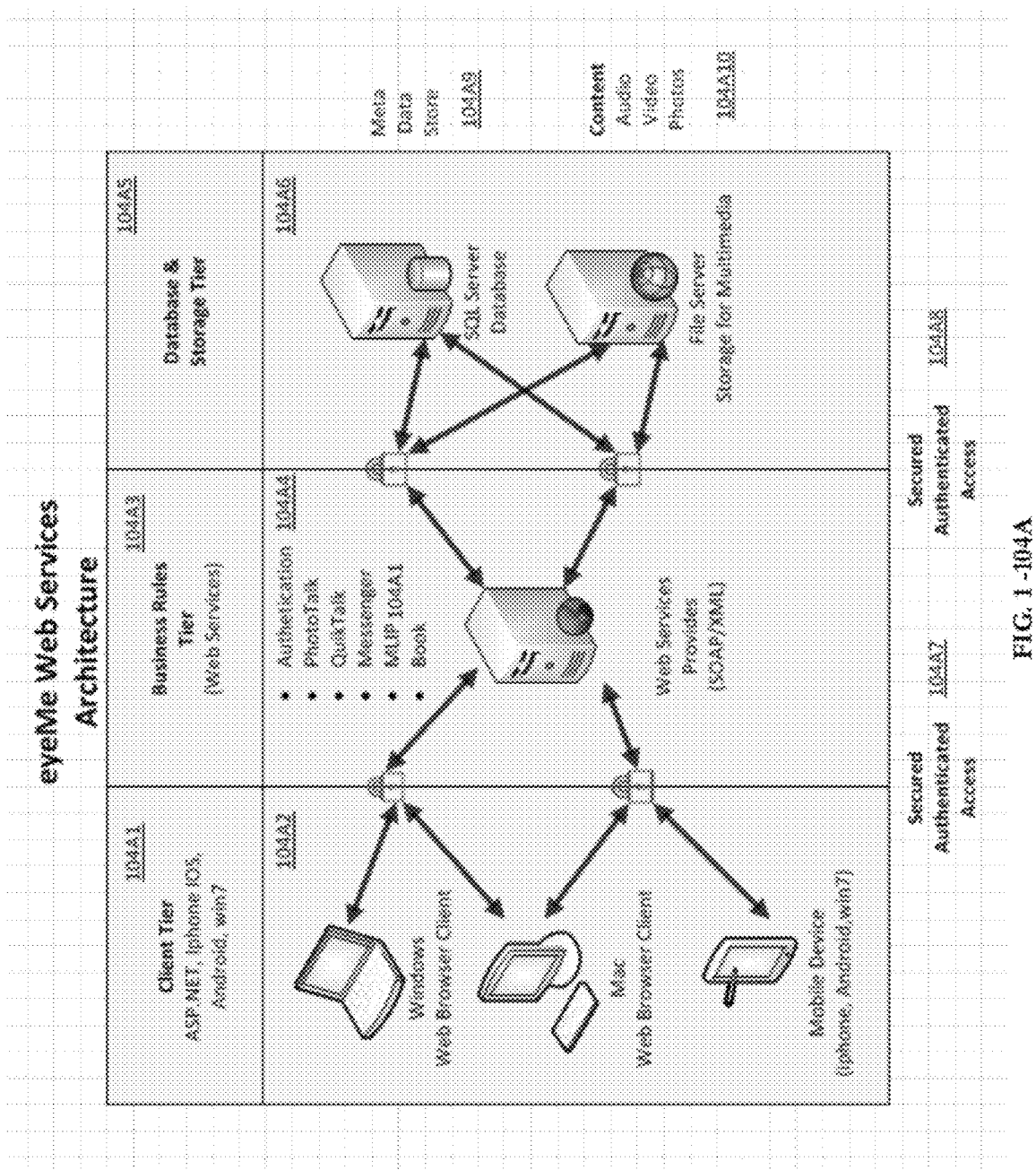
Figure 1:
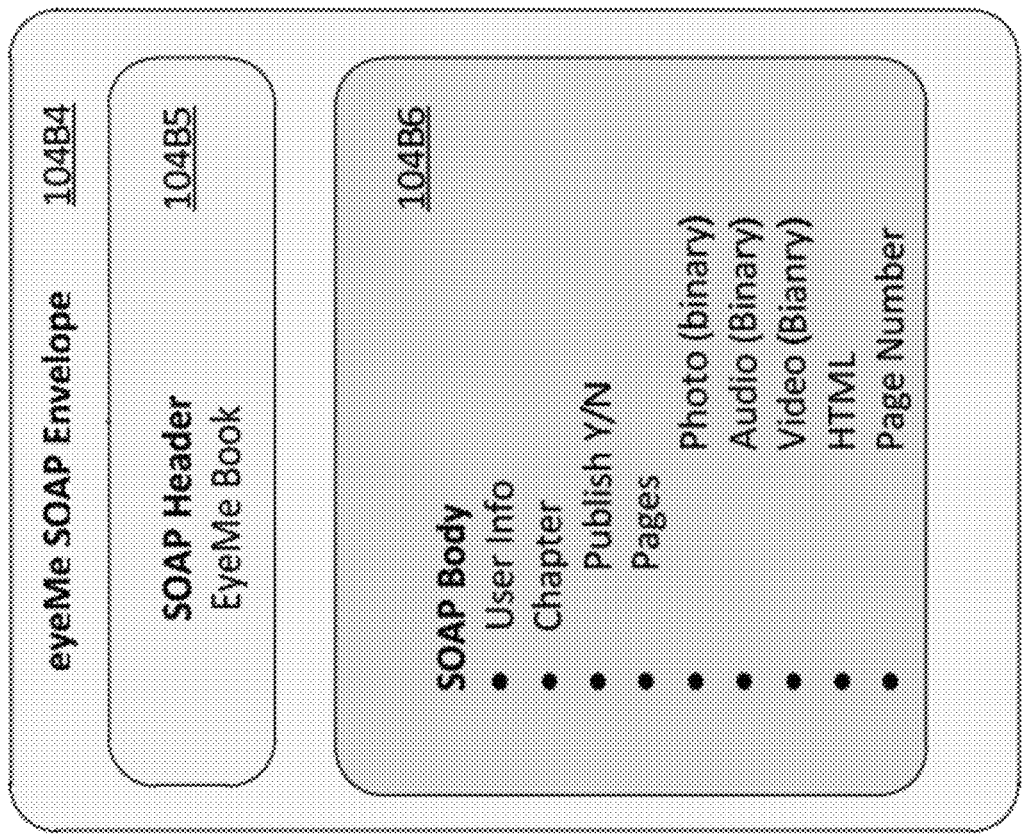
Figure 104B:
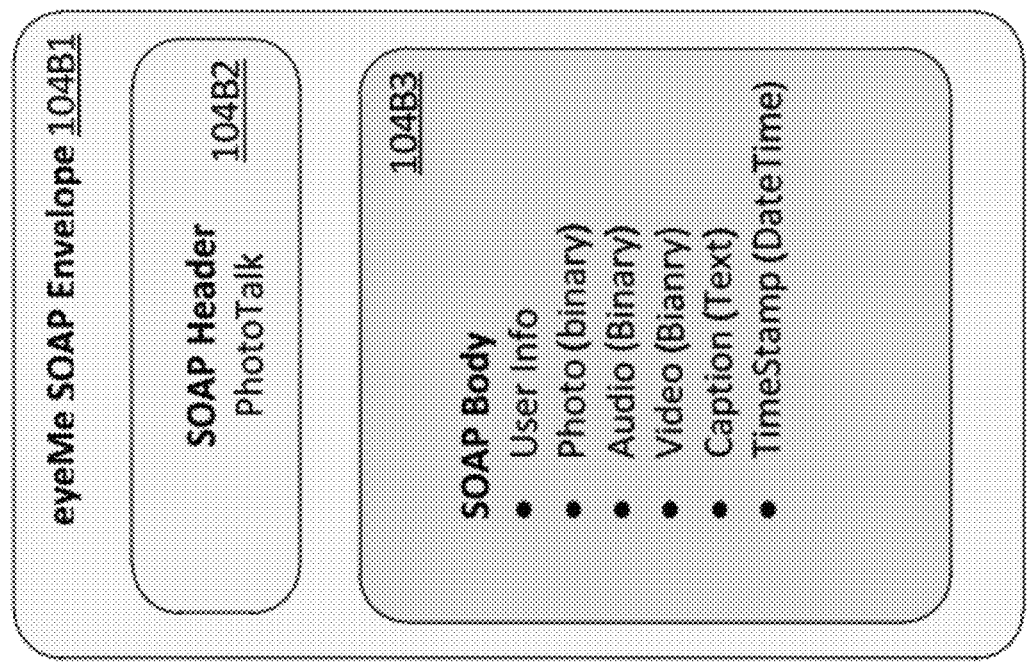

The process for creating a PhotoTalk 210 is as follows:

The current invention provides a web-based content sharing and social network 106 consisting of servers, software application code, web methods FIG. 1-104C that allows users 101 to use Client Tier device 104A2 to take a photo FIGS. 39B and 39C, record a voice description using client tier device 104A2 as depicted in the user steps reflected in FIG. 39 F and FIG. 39G. The photos and the audio files are then combined using the web method FIG. 104C to assemble the photo with the recorded voice and or text (digital element) into a SOAP (XML) packet FIG. 104B3. The SOAP packet containing the photo with recorded audio is then sent and stored on the web server and databases FIG. 104A4 and FIG. 104A5 that maintain a structured hierarchy of the user ID 101, photo file and recorded voice file FIG. 104B3. The photo and voice content created by users 101 on their devices FIG. 104A2 via the PhotoTalk invention FIG. 210 and FIG. 6-601 are stored in a manner in which it the web methods stores the photo, voice, text elements in a file structure using SOAP (XML) packet FIG. 104B3 that allows them through web methods FIG. 104C to be retrieved and assembled as a SOAP (XML) packet FIG. 104B3 and presented upon authenticated requests from file server FIG. 104A4 back to a user's 101 devise 102 that allows the audio to be embedded with the photo and playable by the device 102 default audio player while still viewing the photo FIG. 391.

FIG. 1-104D thru 1-104D2 is exemplary code for web method 104A4 used to attach an image to digital elements and assemble a SOAP (XML) packet 104B3.

Figure 6:
FIG. 6 is a block diagram of the mobile application features associated with the PhotoTalk invention.
Figure 6A:
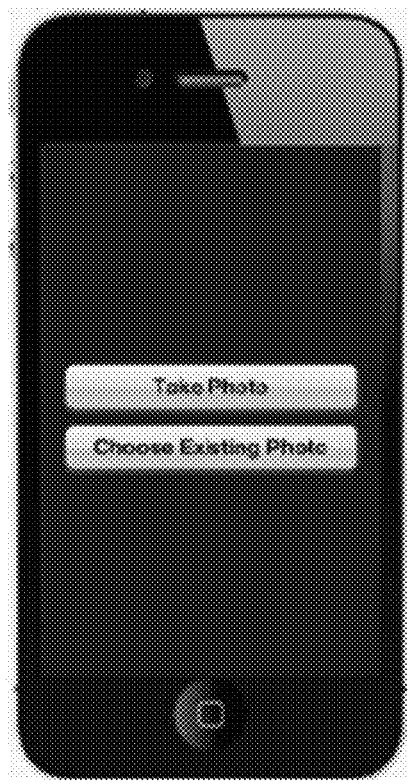
FIG. 6A illustrates the screen used to initiate taking a photo on a mobile device.
Figure 6B:
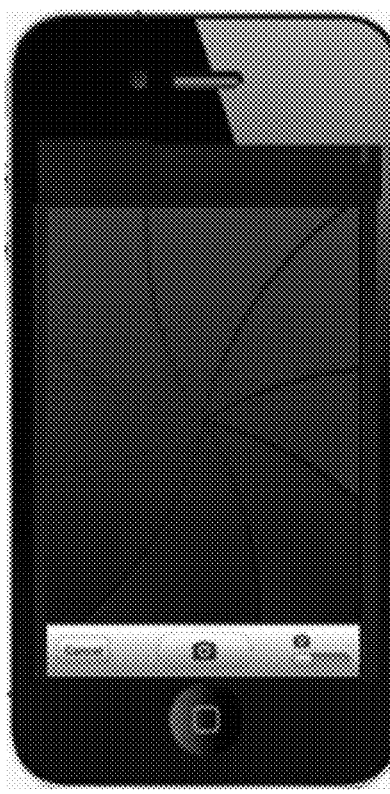
FIG. 6B illustrates a mobile camera application.
Figure 6C:
FIG. 6C illustrates the option to add voice or text with a photo using web methods described in 104 and 104C.
Figure 6F:
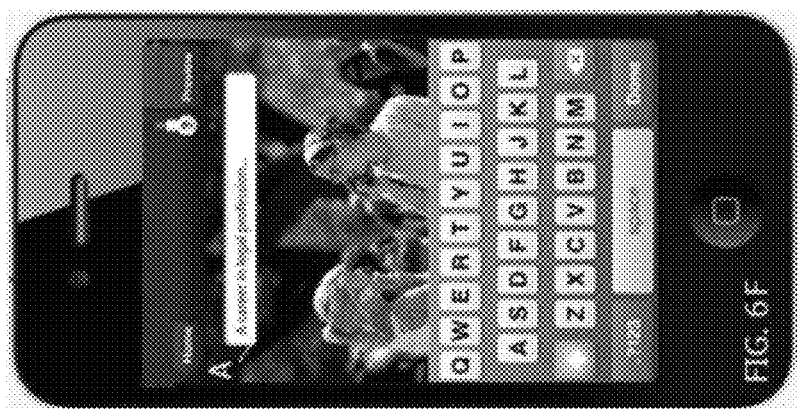
FIG. 6F illustrates how a text caption can be attached with a photo through the invention application.
Figure 6E:
FIG. 6E illustrates a voice comment embedded with a photo and can be heard by clicking the play button or icon.
Figure 6D:
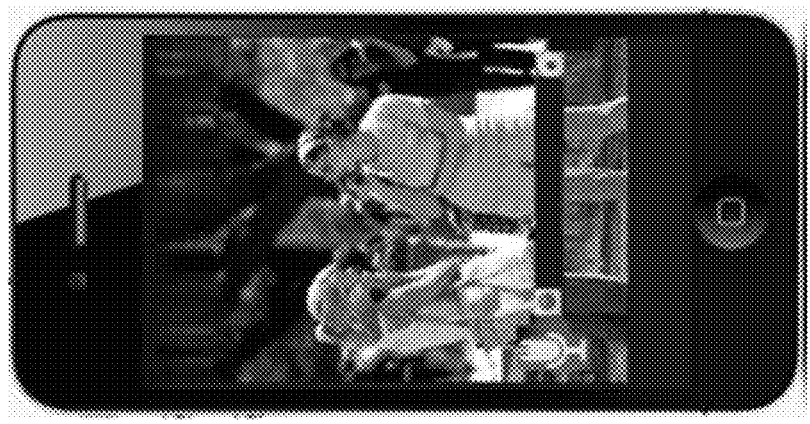
FIG. 6D illustrates the steps to record audio and embed the recording with a photo using the invention application.

Using application services, web methods and software code referenced above and in 104, users 101 can take a photo or select a photo FIG. 6A from the device 102 camera roll/library and then use the aspect of the invention to click FIG. 6B Add Voice FIG. 6C that will activate the inventions voice/audio recording mechanism FIG. 6D that allows the user 101 to record the voice audio FIG. 6D to be associated with the photo. When the user 101 completes the recording to be embedded with the photo FIG. 6D and the invention method 104 automatically embeds the recorded voice comment with the photo FIG. 6E and allows it to be playable when viewed by user 101, user 101A, 101B, etc. within the invention application and service 106 and with non-users 107 through email, text, SMS, social networks 108 FIG. 6I and other forms of digital media via the internet and networks. FIG. 39 illustrates the step-by-step process for using the PhotoTalk feature from a user 101 perspective using a mobile device 102.

Figure 23:
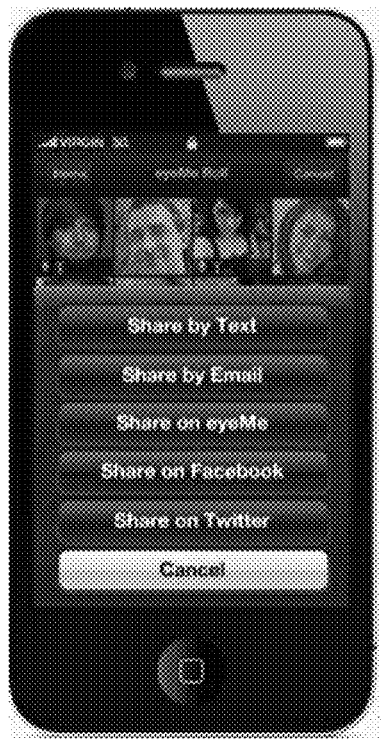
FIG. 23 illustrates an example of photo sharing options.

The mobile Messenger feature 411 integrates with the web Messenger feature 312 and provides the ability to send and receive Photo Talk 410 messages in addition to typed, photo, voice and video messages. Users can review and respond to items by typed message or voice message. The invention application service 104 allows users to send a multimedia based "Message" using its "Messenger" FIG. 23.

Figure 24:
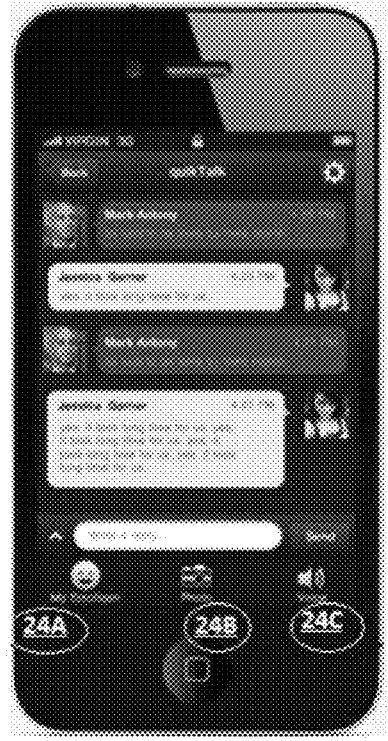
FIG. 24 illustrates an example of a digital media messaging method.
Figure 25:
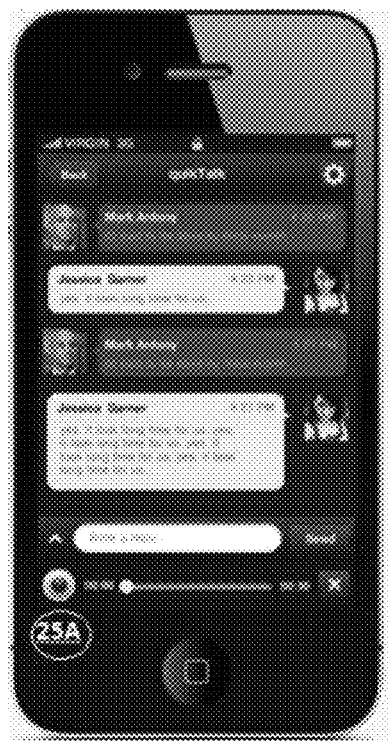
FIG. 25 illustrates an example of recording voice in a digital message.
Figure 26:
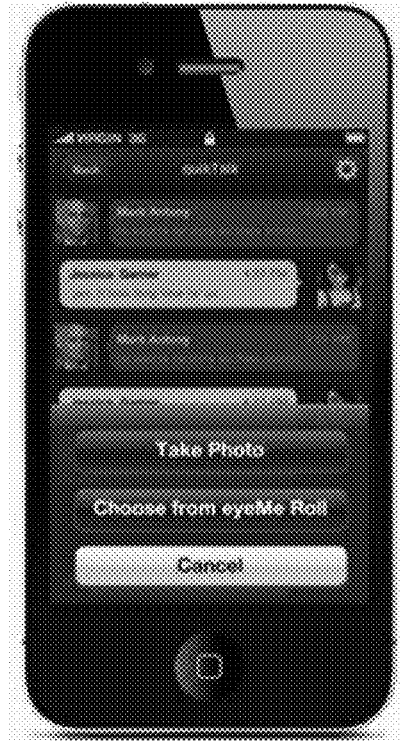
FIG. 26 illustrates the process for selecting and adding a photo in a digital message.
Figure 31:
FIG. 31 illustrates the process and workflow for uploading photo for Life in Photos digital timeline invention.
Figure 32:
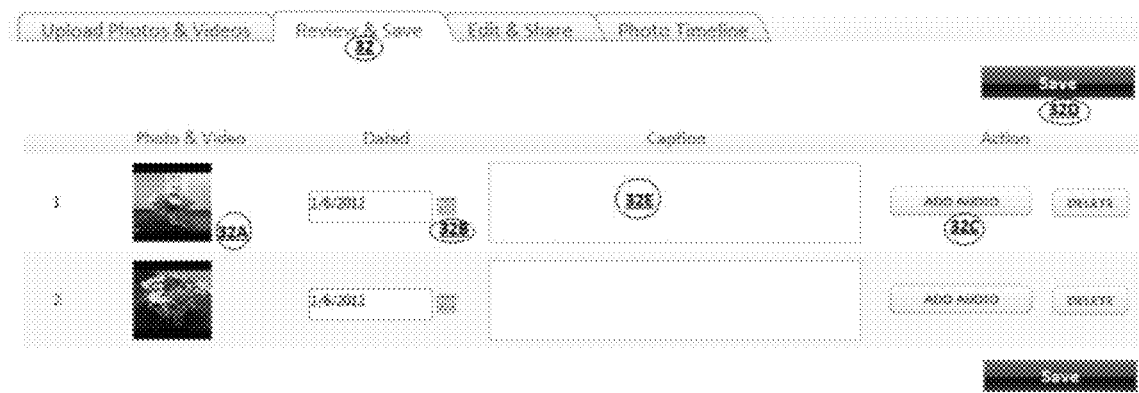
FIG. 32 illustrates the process and workflow for preparing photo for a Life in Photos digital timeline invention.
Figure 33:
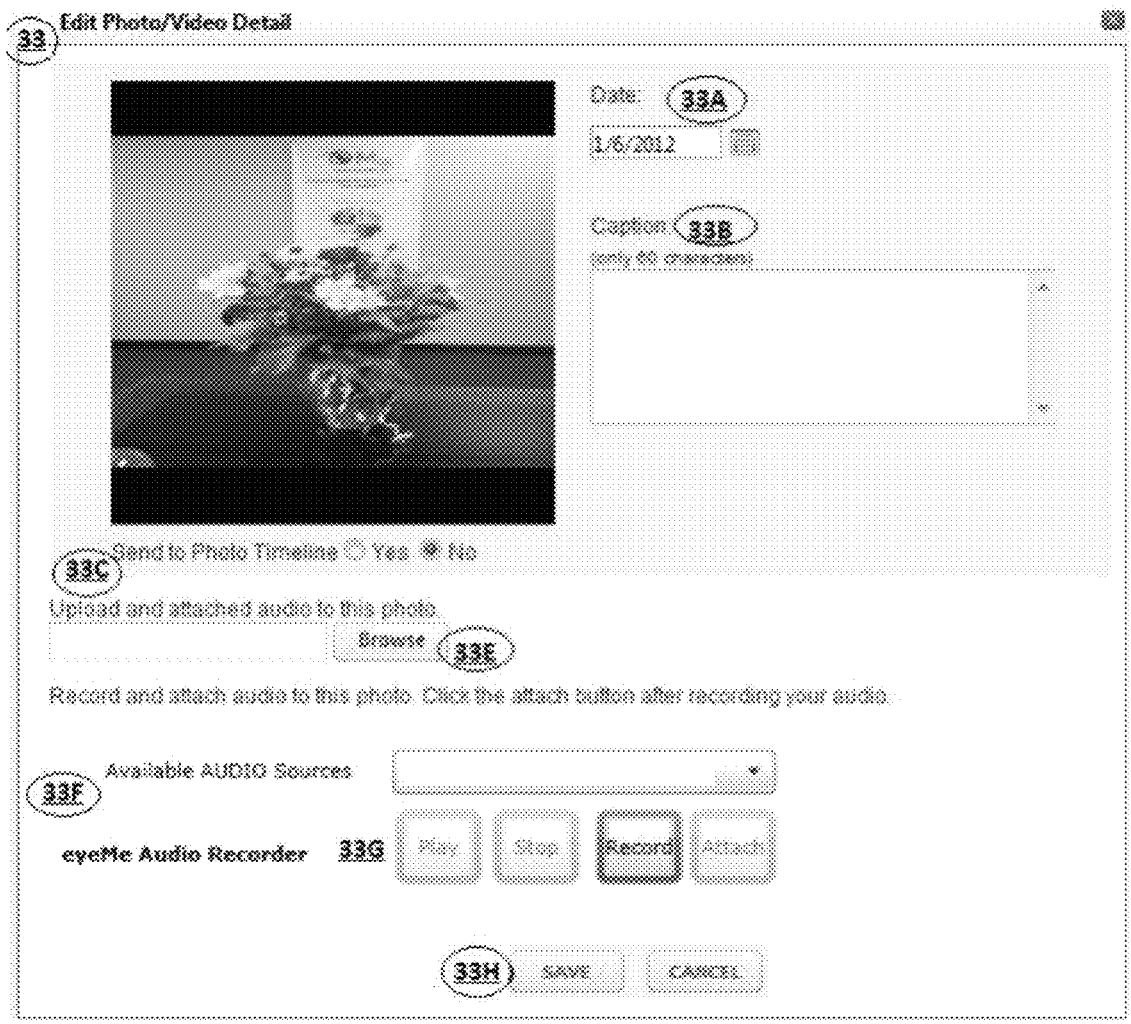
FIG. 33 illustrates the process of simultaneously adding text, voice comments, audio and date to any photo.
Figure 34:
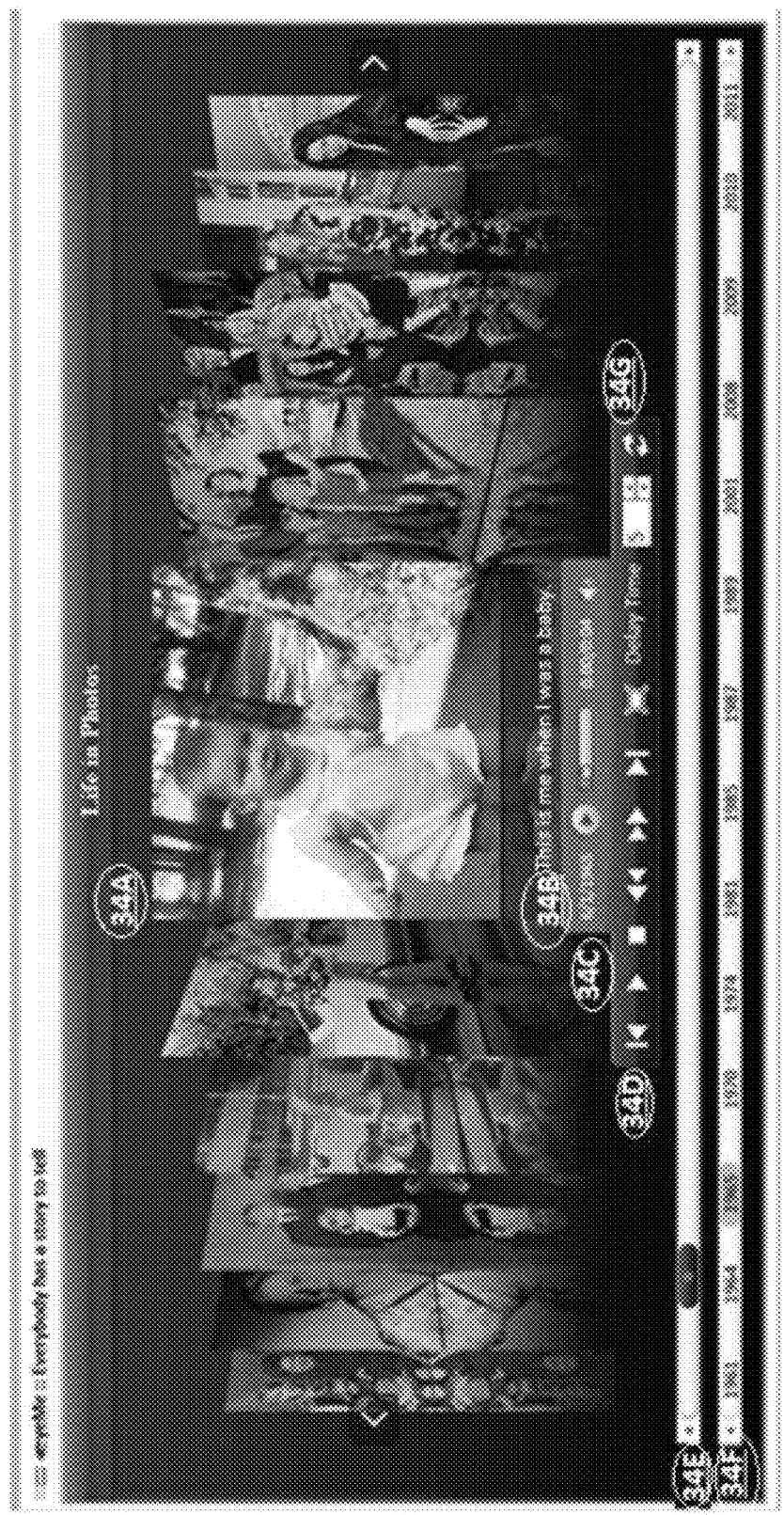
FIG. 34 is an illustration of an example life in photos digital timeline.

The mobile quickTalk invention 412 allows Photo Talk 210, text, voice, photo or video messages in-app between users 101 or mobile contacts. Users can record and send digital contents within the application via SMS/text or other digital methods with the option to use the invention Photicon FIG. 24A feature. Photicons are a method 104 created to allow users to create a personal emoticon FIG. 30.1 using photos on the device or taking a photo with the device FIG. 28.

The method for creating a using a Photicon in a digital message is as follows.

The user 101 sets up their personal Photicons using an invention process and method from the set Photicons option FIG. 28. The user 101 has the option to take a photo using the device 102 or choose an existing photo from the device media library. The user 101 can setup multiple Photicons in the application FIG. 30.1 and the user can select the position of the Photicon FIG. 29A and also add a text caption FIG. 29B associated with that Photicon. When the user 101 is creating a digital message FIG. 30.1 they can select a Photicon FIG. 30.1A and it automatically becomes part of the digital message FIG. 30.2A.

The 413 custom eyeMe roll serves as the storage and retrieval location for photos using the eyeMe PhotoTalk method on mobile (Applies to videos also). Video Talk 414 is referenced in detail comments for FIG. 9 below. Life 415 in Photos referenced in detail comments for FIG. 11 below.

416 Connections are associations between users 101, 101A, 101b, etc. that allow them to set privacy settings to share digital contents FIG. 4 within the invention systems and processes as well as through external communication channels 107 and 108 such as electronic mail, etc. The present invention provides users with a digital circle FIG. 13 to make group associations and have quick access to communicating with connections and sharing digital contents. The present invention also provides a process to Invite 417 non-users to connect with them in the content sharing and networking system 106. FIG. 35 provides a chart representing the various user types along with the connection relationships.

418 The Social Post FIG. 37 invention aspect provides methods to post text FIG. 37A, photos FIG. 37B, voice FIG. 37B or videos directly to the invention social networking web site (the What's going on? update news feed), or directly post to third-part social networks and blogs and applications FIG. 37E. The uniqueness of this invention aspect is the ability to record FIG. 38A and send a voice post to social networking 108 and blog news feeds through the network service and other social and private networks 108. The current invention provides a web-based content sharing and social network 106 consisting of servers, software application code, web methods and databases FIG. 1-104A & B that maintain a structured hierarchy for text, photos, voice and video content created by users 101 on their devices 102. For the Voice Post feature PhotoTalk invention FIG. 410 and FIGS. 6-601 When users 101 take photos and add voice or text to them through the invention applications 104, the data is transmitted to the network 106 and stored in a database structure within the network 106 in a manner in which it the web methods stores the photo, voice, text and video elements in a file structure that allows them to be retrieved and assembled as a SOAP (XML) packet and presented upon authenticated requests back to a user on their devise 102 that allows the audio to be embedded with the photo and playable by the device 102 default audio player while still viewing the photo.

Figure 3:
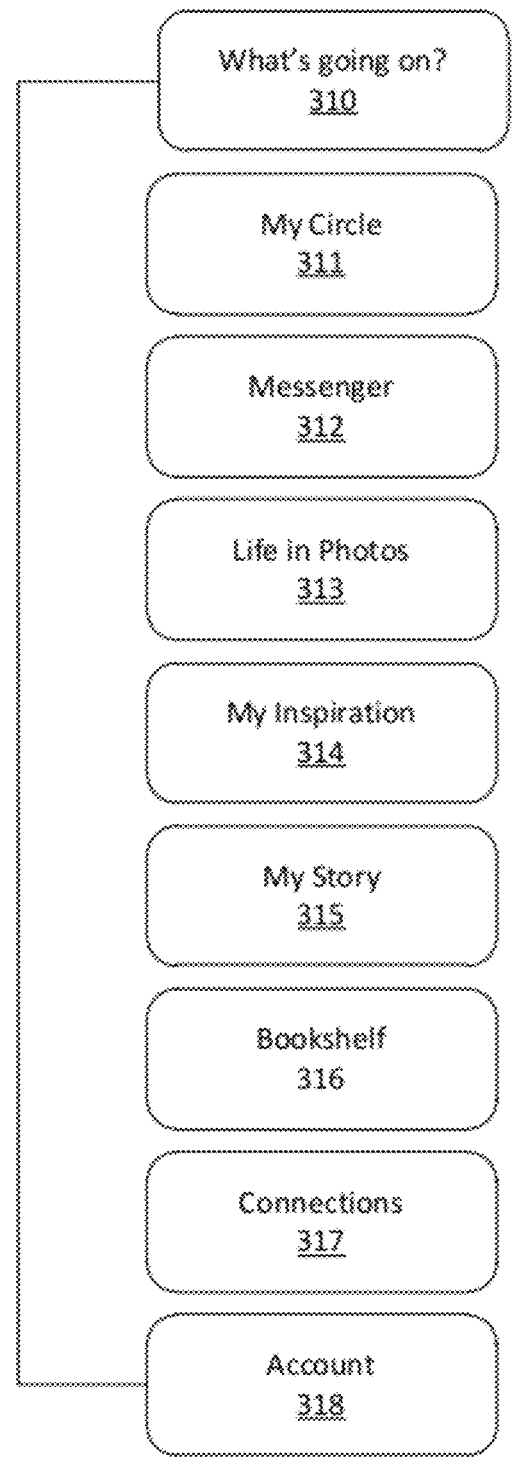
FIG. 3 is a block diagram of web features.

FIG. 3 is a block diagram example of invention features available for use on desktop and tablet devices 102 accessing the internet using services and methods 104 that users 101 can create and share digital media contents with other users 101A, 101B, 101C, etc. The features referenced in 310 thru 318 are illustrated in further detail starting with FIG. 11 below.

FIG. 4 is a block diagram of the relationship between mobile features FIG. 2 and web features FIG. 3. Mobile device use has grown enormously and has become a significant means of creating and sharing content. Taking this in to consideration and with the expectation that this trend will continue, invention methods and services 104 and content sharing methods 106 were designed to allow users 101 and 107 to have the flexibility to share and create digital media contents (photos with voice 210; digital messages with voice and photos 211, 212, 311 and 312; Life in Photos 215 and 313; My Inspiration 314; My Story 315 and Social Posts 218 and 310) on both mobile and desktop devices 102.

Figure 5:
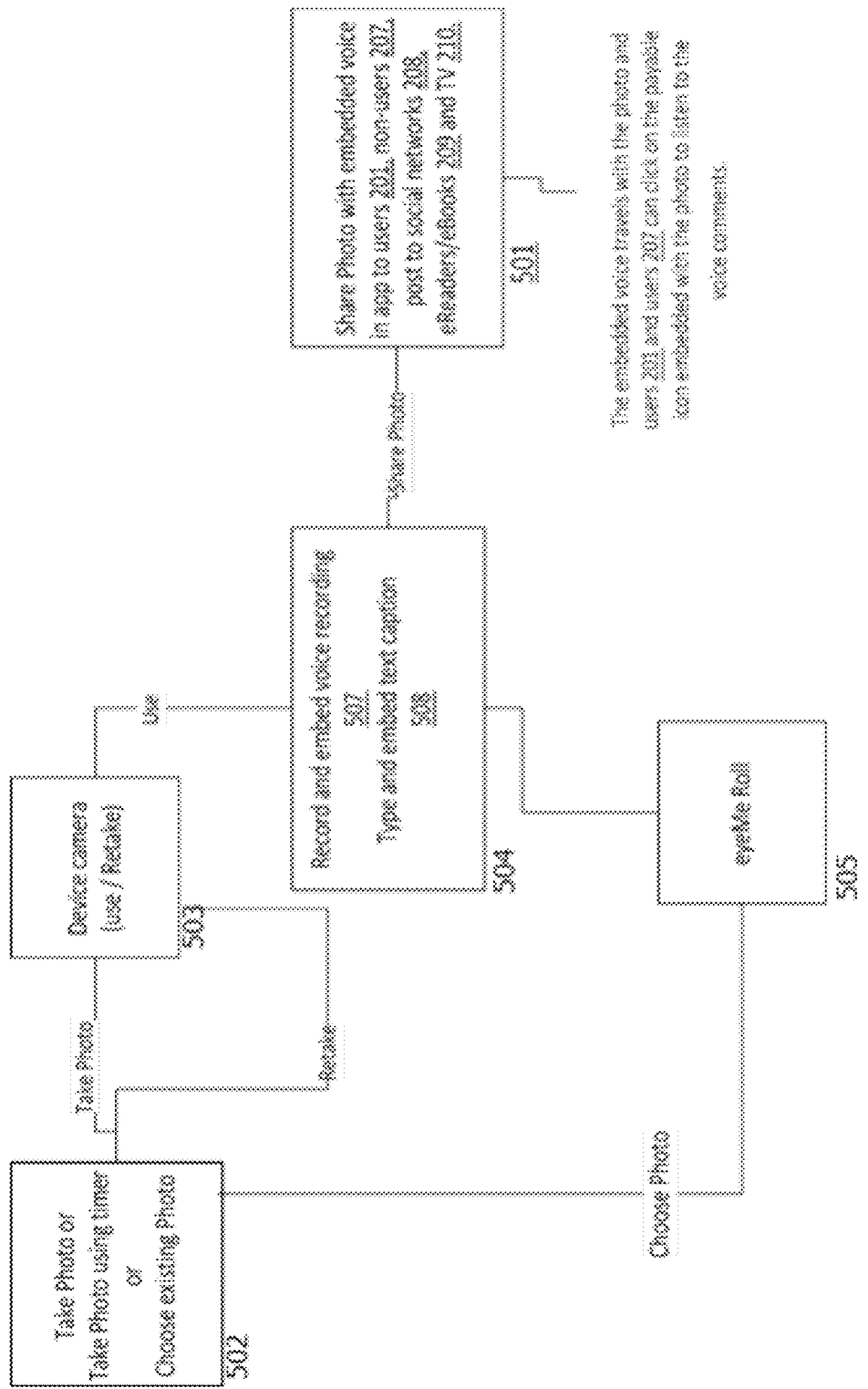
FIG. 5 is a flow diagram of an example process for generating a photo with embedded digital elements.

FIG. 5 is a flow diagram of an example process for generating a photo with embedded digital elements of voice and or text. In this illustration a user 102 can take a photo with a device 102 or select an existing photo from a device's camera roll and then embed a voice comment 507 or a text caption of the photo 508 or both a voice comment 507 and a text caption 508 in the same photo. Detailed flow and screenshots provided in FIG. 19 thru FIG. 22.

Figure 6I:
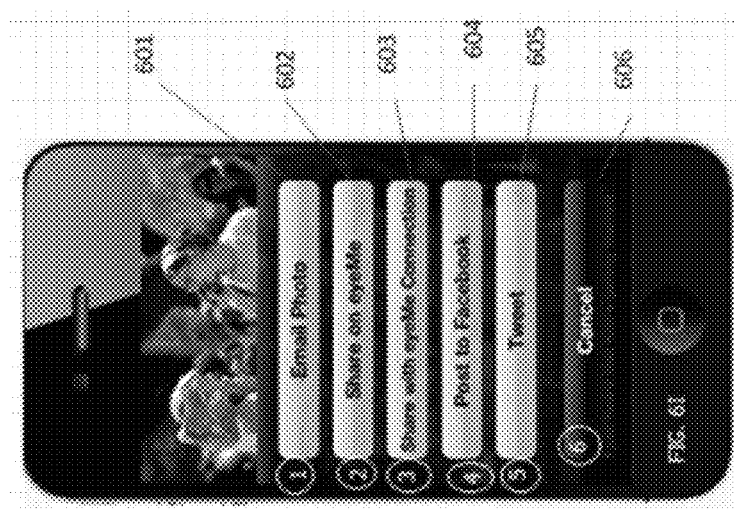
FIG. 6I illustrates the options available for sharing the photos created with this invention.
Figure 6H:
FIG. 6H illustrates invention edit mode options 1 edit text 2 edit voice recording; 3 play and listen to voice recording; 4 preview the photo; 5 crop the photo size; 6 delete the photo; 7 adjust the filter effects of the photo.
Figure 6G:
FIG. 6G illustrates a photo with a text caption.

FIG. 6 is a block diagram of the mobile application features and provides illustrations of the PhotoTalk invention through FIG. 6I

6A—illustrates the screen used to initiate taking a photo on a mobile device

6B—illustrates a mobile camera application

6C—illustrates the option to add voice or text with a photo using web methods described in 104 and 104C.

6D—illustrates the steps to record audio and embed the recording with a photo using the invention application.

6E—illustrates a voice comment embedded with a photo and can be heard by clicking the play button or icon

6F—illustrates how a text caption can be attached with a photo through the invention application.

6G—illustrates a photo with a text caption

6H—illustrates invention edit mode options 1 edit text; 2 edit voice recording; 3 play and listen to voice recording; 4 preview the photo; 5 crop the photo size; 6 delete the photo; 7 adjust the filter effects of the photo.

6I—illustrates the options available for sharing the photos created with this invention.

Figure 7:
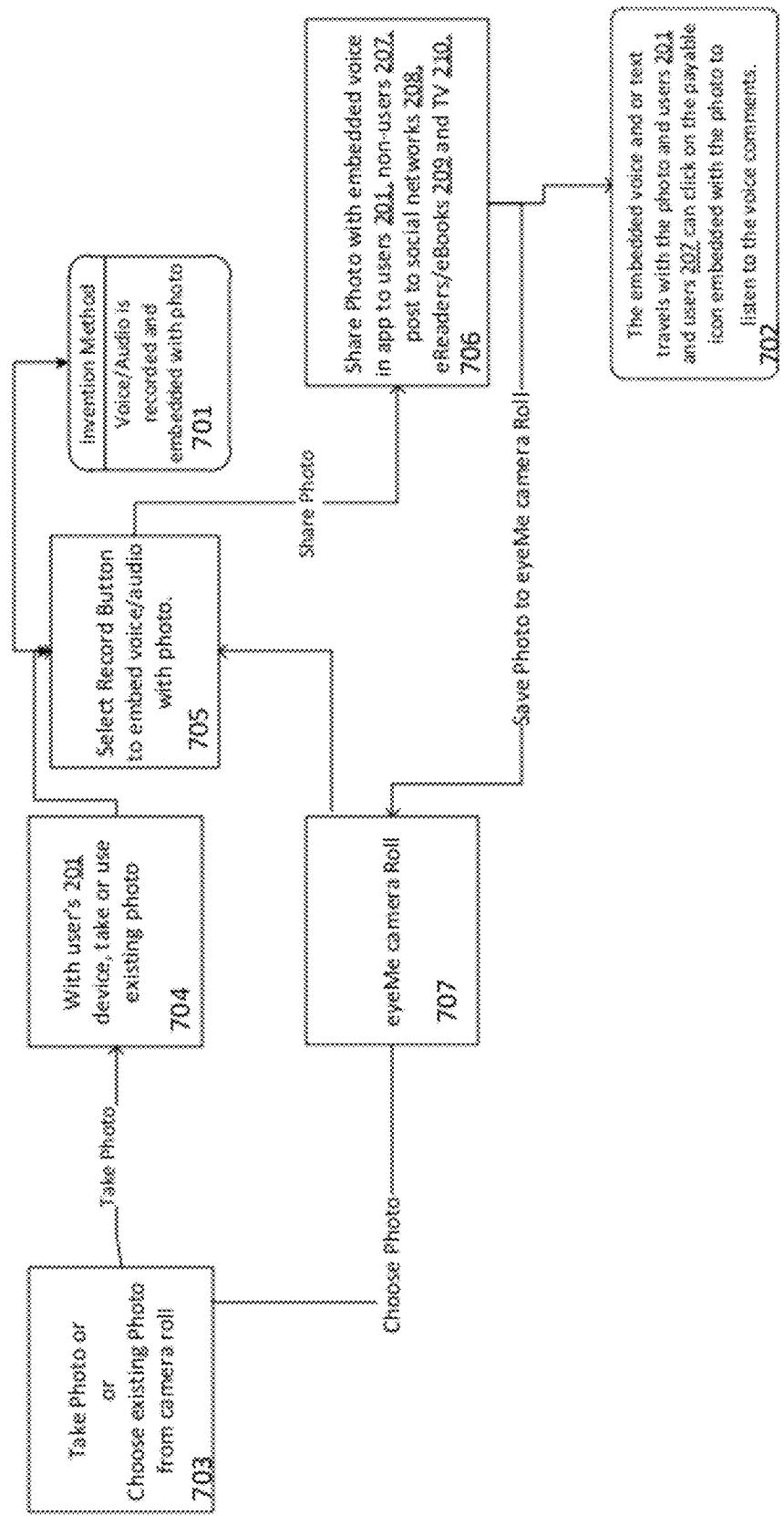
FIG. 7 is a flow diagram of an example process for generating a photo with embedded voice.

FIG. 7 is a flow diagram of an example process for generating a photo with embedded voice. Detailed flow and screenshots provided in FIG. 19 thru FIG. 22.

Figure 8:
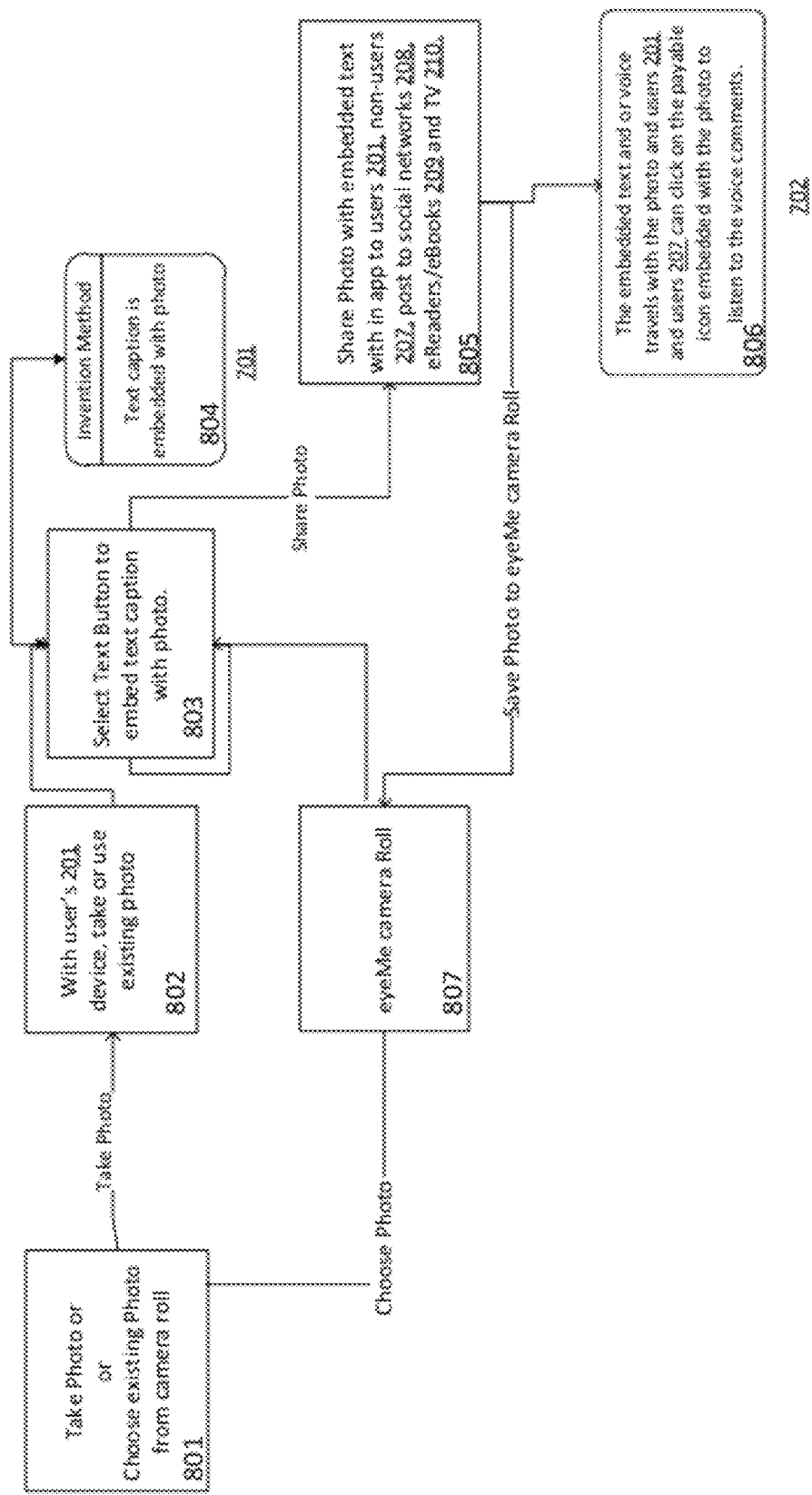
FIG. 8 is a flow diagram of an example process for generating a photo with embedded text.

FIG. 8 is a flow diagram of an example process for generating a photo with embedded text. Detailed flow and screenshot is provided in FIG. 19 thru FIG. 22.

Figure 9:
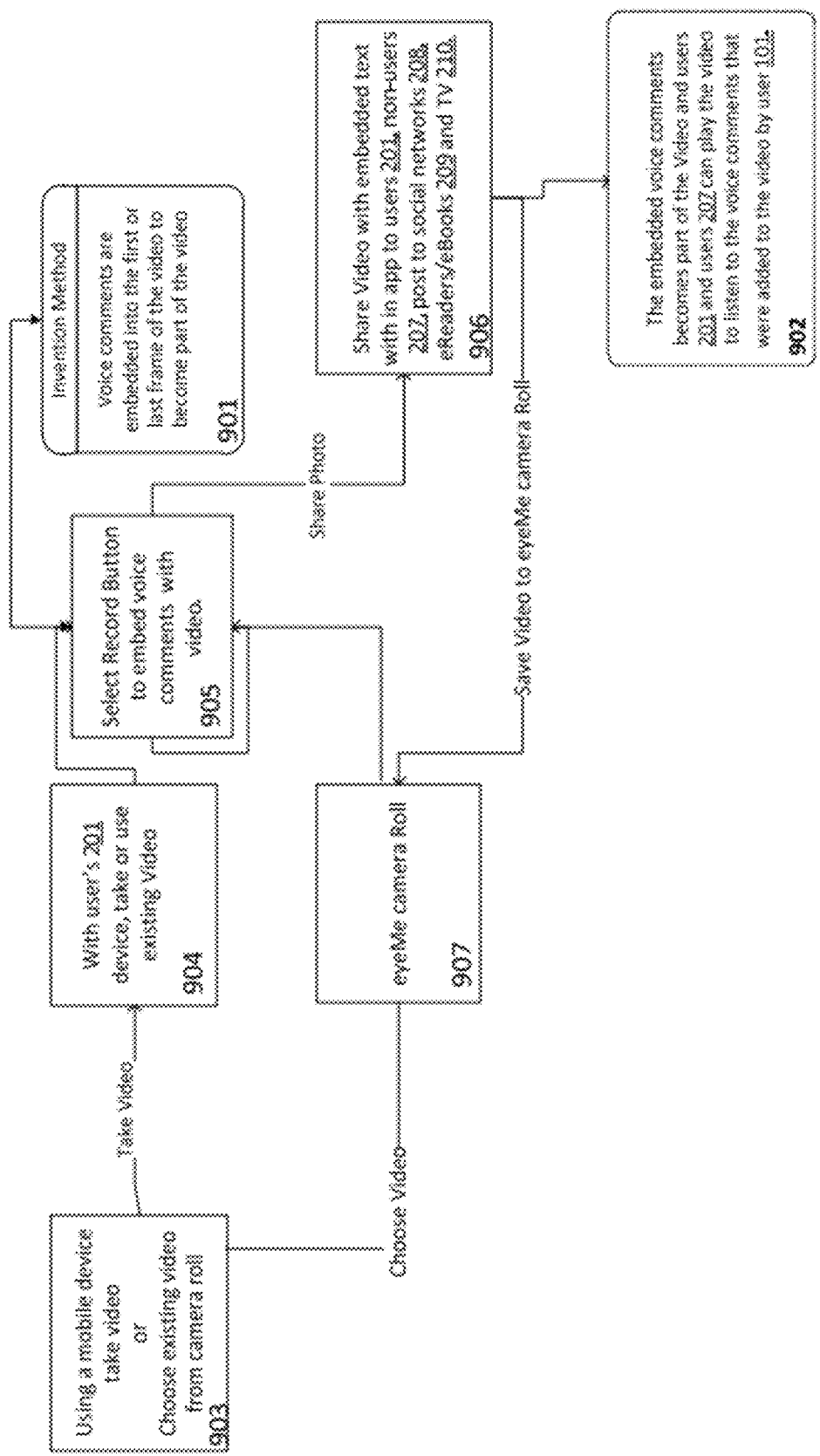
FIG. 9 is a flow diagram of an example process for inserting and embedding voice into a video on a mobile, tablet or desktop device.

FIG. 9 is a flow diagram of an example process for inserting and embedding voice into a video on a mobile, tablet or desktop device. This aspect of the invention is named Video Talk. With the enormous growth of video taking and sharing on mobile devices this aspect of the invention expands the use of videos taken on mobile devices by allowing a video being taken or an existing video on a device to become editable and therefore have the capability to record and insert a voice 903 introduction or trailer to the video. It is using a device to convert a video into a movie like format with introduction or trailer comments inserted by users 102 using application services and methods 104 and 901. Users 102 are then able to share the video with inserted voice comments with other users and devices as described in 904.

Figure 10:
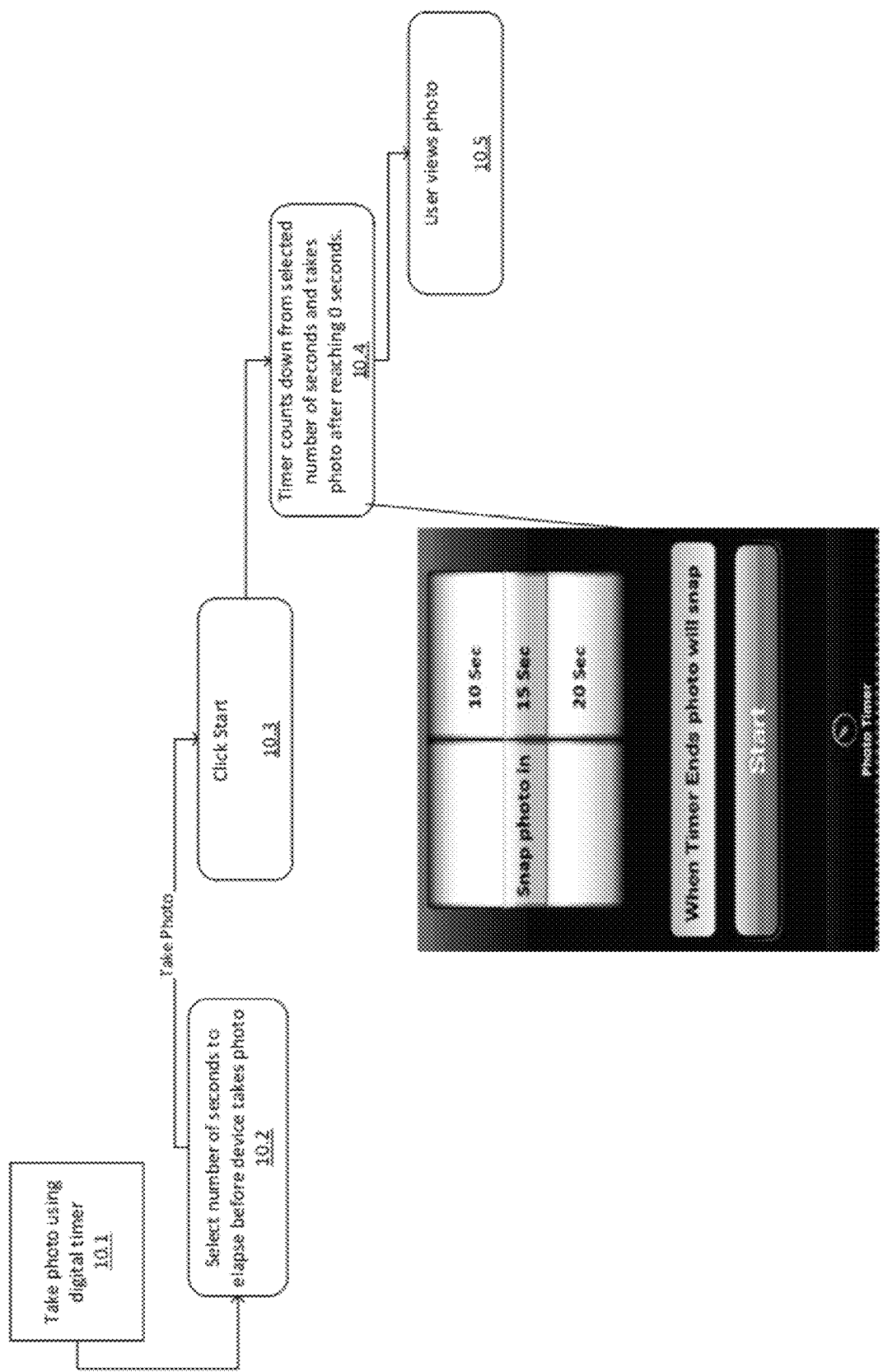
FIG. 10 is a flow diagram and image of a photo timer being used to take a photo on a mobile device.

Referring to FIG. 10, a further aspect of an embodiment of the invention provides users with the ability to taken a photo on a mobile device using an application timer FIG. 10 that can be set by the user to delay the number of seconds a mobile devise camera will actually snap the photo. This invention allows users to take a photo hands-free so they can take an individual photo or be part of a group photo. The user of a mobile device with a camera with application services and methods 104 and invention process as described in FIG. 10 can choose to take a photo 10.1, select the number of seconds 10.2 that they want to elapse prior to the invention's camera application takes the photo 10.3, giving the user 101 time to mount the camera device and position themselves to be in the photo.

Figure 11:
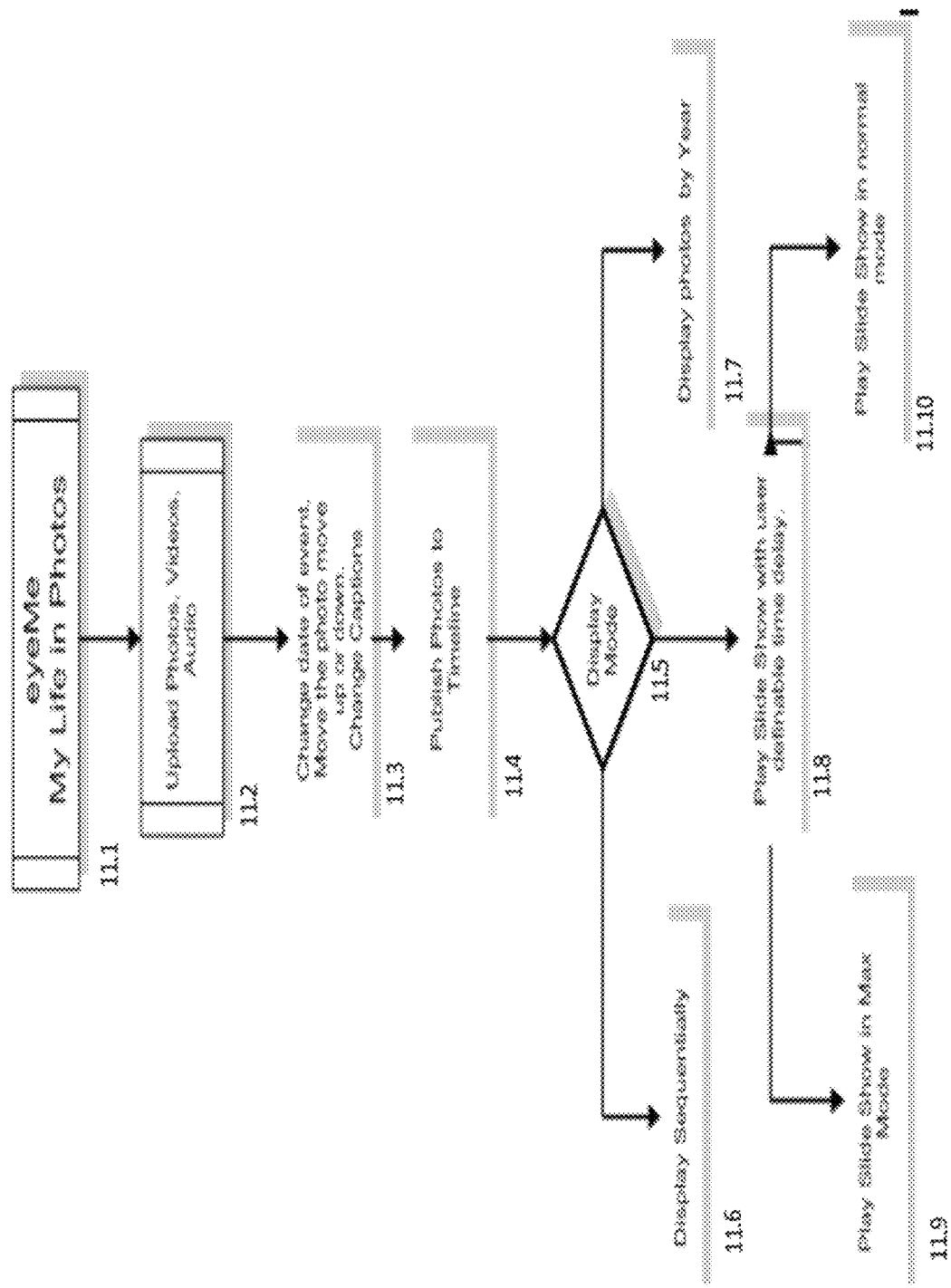
FIG. 11 is a flow diagram of an example process for creating a life in photos digital timeline.
Figure 12:
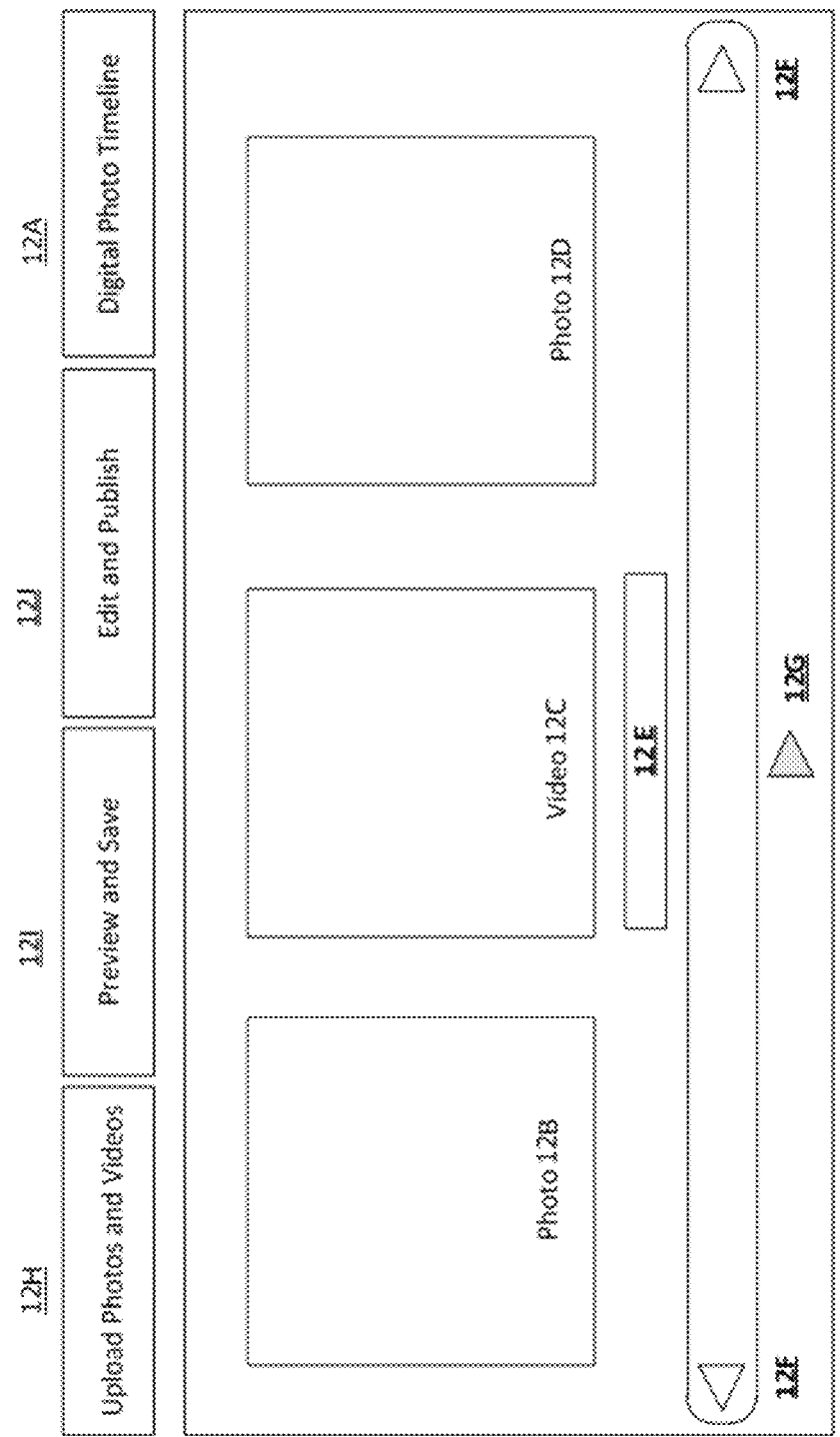
FIG. 12 illustrates an example Life in Photos digital slide show.

FIG. 11 is a flow diagram of an example process for creating a life in photos digital timeline. My Life in Photos referenced in 215, 313, FIG. 16, FIG. 17, FIG. 18 and FIG. 31-FIG. 34 provides a chronological photo timeline of the user's 102 selected photos. The same application services and methods 104 used for embedding voice into photos and video are also used here to create voice embedded narration into photos that can be heard while viewing the photos in a digital slide show FIG. 34. Video clips can be added to the Life in Photos FIG. 34 and played sequentially in an entertaining slide show as illustrated in FIG. 12 and shown in FIG. 34. The current invention provides a web-based content sharing and social network 106 consisting of servers, software application code, web methods and databases FIG. 1-104A &B that maintain a structured hierarchy for text captions, photos, voice and video content used to create this aspect of the invention. For the Voice Post invention referenced in FIG. 37-38B allows users 101 record a message on their device 102 and transmit it to a third party social network 108 through standard APIs provided by the social networks 108 captions to them through the invention applications FIG. 1-104A & B. The data is transmitted to the network 106 and stored in a database structure within the network 106 in a manner in which it the web methods posts the voice post element to the designated social-media news feed for the user 101 FIGS. 38A and B.

The My Life in Photos feature is designed to allow users to create a digital slide show that reflects their life in photos. This feature allows a user to upload photos individually or in bulk FIG. 12H. The system will automatically sort the photos with dates on the timeline FIG. 12E and FIG. 34F or the user can edit the photo dates FIG. 32B and FIG. 33A to create the chronological order they desire. The user can add text captions FIG. 32E and FIG. 33B or audio narration FIG. 32C and FIG. 33G to individual photos that play the audio FIG. 34C or display captions FIG. 34B in sync with the photos FIG. 34A that they are attached to. Video files can also be added to the photo timeline FIG. 31A and played in sequence with the photo files. Viewers will experience a movie-like experience when viewing a user's 102 life in photos. A multi-media recording application FIG. 33G is also provided to allow users to instantly create audio and video files. The Photo feature allows review and save functionality. The My Life in Photos invention FIG. 11, FIG. 12 and FIG. 34 uniquely provides the ability to show and play photos, photos with audio and videos seamlessly on a date driven digital timeline. The system will create a dynamic photo timeline based upon the dates of the photos. Viewers can view the photos by year, set the transition time, choose transition styles and view in full screen mode. This timeline is specifically for photos and videos.

Figure 13:
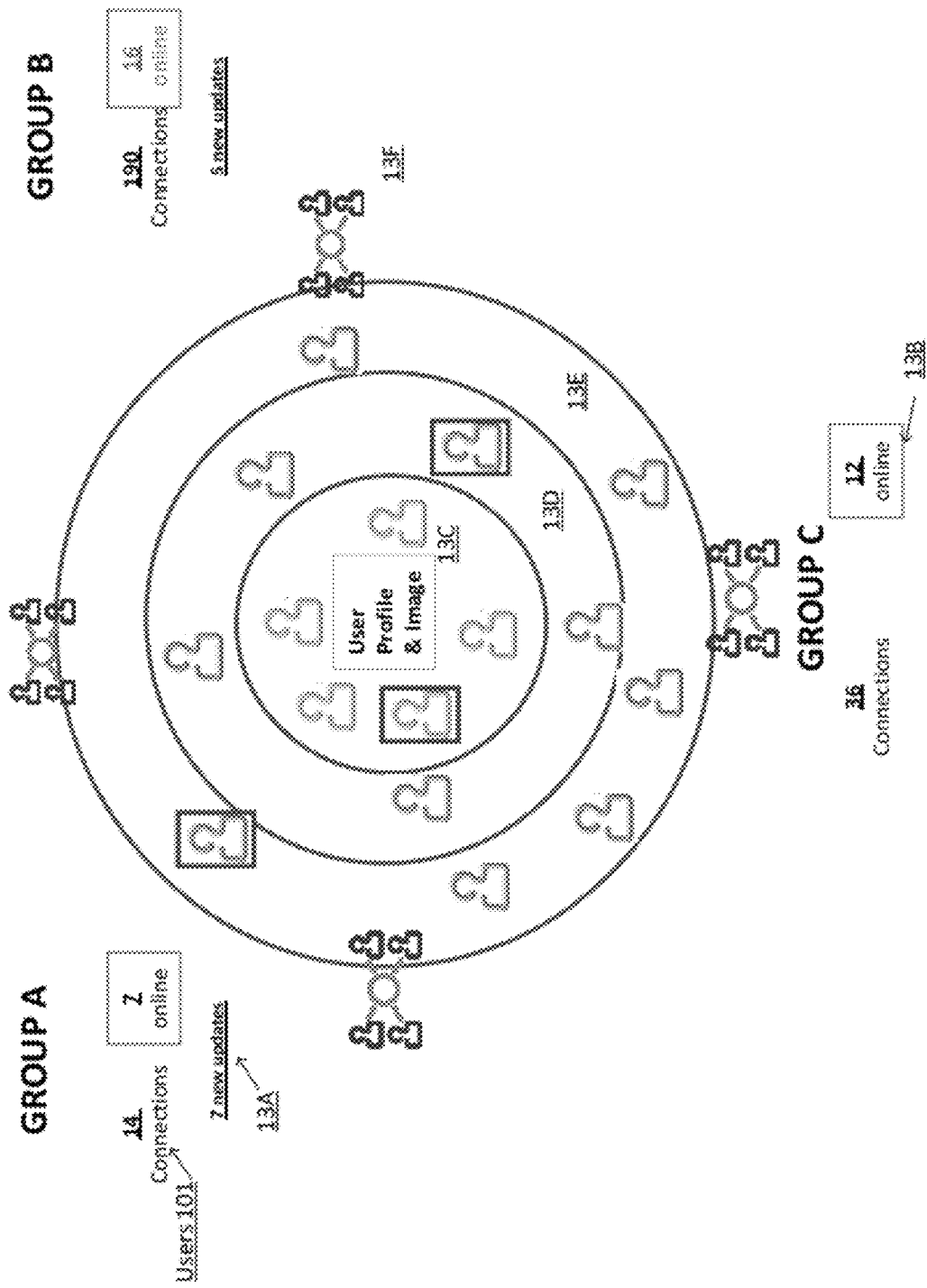
FIG. 13 illustrates a digital circle of connections.

FIG. 13 illustrates a digital circle of connections FIG. 2 216 whereby users 102 can select other users 102A or groups to be part of a digital interactive circle FIG. 13. The aspects of this part of the invention allows users 101 to define connection type with other users 101A, 101B, 101C, etc. and place them on a circle of connections with different relationships. For example Inner Circle of contacts FIG. 13C, Group A FIG. 13D, Group B FIG. 13E. In addition the application services and methods 104 and content sharing and social networking processes 106 allow users to interact and share digital media contents referenced in FIG. 4.

FIG. 14 illustrates an example of a user's 101 digital story page and book as referenced in Digital media features FIG. 3. My Story invention FIG. 14 and FIG. 15 provides users 102 with the ability to create and share a multi-media digital story or book. The application services and methods 104 provides users 102 the ability to create a cover, table of contents FIG. 14A and digital pages FIG. 14 and FIG. 15 where text, photos, voice/audio clips and video clips can be incorporated into My Story 315. The present invention provides the ability to add multi-media content into a text editor and then subsequently view and play the content on the page using application services and methods 104.

The digital media and social networking application appeals to masses and can be used by Individuals, Family Group, On Behalf of Others, Religious Organizations, Social Organizations, Businesses, Sports Organizations and Educational Institutions, for example.

The software application tools and services 104 allows users 101 to easily create and share "their story" on their life and experiences through a combination of text, photos, audio and video that are viewed in editable self-contained frames on digital pages FIG. 15 on desktop/notebook/laptop computers, mobile phone and tablet devices. Viewers will be able to read, view and play multimedia content (voice audio, music audio, video, and photos with embedded voice 501) directly on the pages FIG. 14 giving users a LivePage experience using the invention processes and technology. LivePage refers to the digital contents on the page becoming alive for viewers.

The application provides the ability to use an editable multi-media element within a text editor FIG. 15 that is viewed and played within the multi-media element container. To create the LivePage, a text editor is opened to create an editable text template. A frame is coded using media element formats that will allow multimedia elements to be embedded within a text editor. A multimedia frame element is coded and linked to program buttons that allow the multimedia element to be inserted on the page from the click of a button or icon FIG. 14C. The media elements that are applied to the frame are voice audio, audio links, video, video links, music audio music audio links. The method embeds a voice recorder on a digital page(s) to allow users to record playable voice content on the digital pages when viewed or shared for viewing by other users 107. Custom web methods and software application code 104 has been developed in addition to using HTML5 code and a Microsoft Silverlight® media brush tool to give the multimedia frame element multimedia properties. Other technology tools may be used in addition to the Microsoft Silverlight® media brush. Software code 104 is used to allow the multimedia frame to have text wrap options such as in-line or tight wrap formats. Software code 104 is used to set the multimedia frame element to be moveable on the page by the content creator and the text would wrap around the moveable element. Software code is 104 also applied to photo images that allow audio recordings to be attached to a digital image and when the photo is viewed in the eyeMe My Life in Photos application FIG. 33G the audio recording plays while the photo is displayed in the view or slideshow mode FIG. 34. This process described combination of software code 104 and software tools referenced provide the following functions to content creators and viewers.

Regarding content creators, the user may record and insert or insert voice audio FIG. 15B, audio links, video FIG. 15C, video links, music audio FIG. 15D, music audio links on to a text editor FIG. 15 in the form of a digital page(s), electronic book format with or without flip page technology or e-mail page and then have the ability to rearrange the media elements within and around the user created text on the page. The user can also record and attach audio to a digital photo FIG. 34A. Content viewers provide the ability to read and view content on the digital page(s) and listening to audio or viewing video elements within the multi-media frames on the text page(s) that are contained within and around the text on the page(s) FIG. 14 and FIG. 15. In terms of a digital book (electronic book consisting of multiple pages), this process brings the page alive for the viewer and is referred to as "LivePage." The user can listen to an audio file that is attached to a digital photo while viewing the photo in My Life in Photos application FIG. 34 or other applications including digital paper or greeting cards.

LivePage technology, as discussed, is used to create a multimedia based page or set of pages using its "LivePage" technology in a commonly used text editor format that allow embedding of formatted text, photos, audio, video and YouTube video links My Inspiration feature provides a shared experience that others can be inspired by or learn from. Information such as evidence or proof of your belief or faith may be featured, for example. Features include text, photos, voice/audio clips and video clips. The My Inspiration feature is designed to allow individuals or organizations to share experiences that others can inspire others or allow them to learn from. It provides a unique interface to create text and multi-media content using eyeMe LivePage technology. The user can insert text, audio, video, photo or a YouTube video link. My Inspiration can be shared with other social network sites, sent via e-mail or sent directly to the inbox of eyeMe users.

FIG. 27 illustrates a photo added and sent in a digital message. FIG. 28 illustrates the selection and use of Photicons in a digital message; the method for creating a using a Photicon in a digital message is as follows.

The user 101 sets up their personal Photicons using an invention process and method from the set Photicons option FIG. 28. The user 101 has the option to take a photo using the device 102 or choose an existing photo from the device media library. The user 101 can setup multiple Photicons in the application FIG. 30.1 and the user can select the position of the Photicon FIG. 29A and also add a text caption FIG. 29B associated with that Photicon. When the user 101 is creating a digital message FIG. 30.1 they can select a Photicon FIG. 30.1A and it automatically becomes part of the digital message FIG. 30.2A.

FIG. 29 illustrates the process and method for selecting a photo for a Photicon. FIG. 30 illustrates a selected photo for a Photicon.

FIG. 35 is an illustration chart of registration user types. There are different types of registrations that can be afforded to users. An Individual Registration Type is an individual person registering for them. On Behalf of others Registration Type is an individual person registering on behalf of someone else that may not be able to do so (i.e. starting MyLife in Photos for a new born baby or creating content on behalf of a disabled individual). A Memorial Tribute Registration Type is a registration by someone to create eyeMe content in the memory of a deceased individual. A Family Group Registration Type comprises a group of individuals belonging to a family creates an eyeMe account to share information about their family history and also allow members to become affiliated with the family and share content. A Religious Organization Registration Type features an organization such as church, synagogue, mosque, temple and other similar institutions creates an eyeMe account to share information about their organization and also allow members to become affiliated with the organization and share content. A Social Organization Registration Type features an organization that is a non-profit or for profit organization with social agenda. This may include trade associations, industry groups and similar organizations. They create an eyeMe account to share information about their organization and also allow members to become affiliated with the organization and share content. A Professional Sports Organization Registration Type features an organization that is a professional sports organization like a basketball, baseball, football, ice hockey, soccer, etc. They create an eyeMe account to share information about their organization and also allow team members (current and previous) to become affiliated with the organization and share content. This feature also allows fans to connect with the professional sports organization. A Business Registration Type features a for profit business entity that creates an eyeMe account to share information about their organization and also allow employees (current and previous) to become affiliated with the organization and share content.

FIG. 36 is an illustration chart that describes the Hide Me privacy setting The "HideMe" features is a unique feature to allow users to be hidden from the application search. This feature is provided to allow the user maximum flexibility with their privacy settings. The user's eyeMe contents will not show in the eyeMe Library search. The user's profile and contents will be hidden from the general search. The user will be able to share your contents with specific individuals. Individual search shows results in a grid were the searcher can select the public content to view or send an invitation to the individual or entity requesting permission to view their content.

Figure 38:
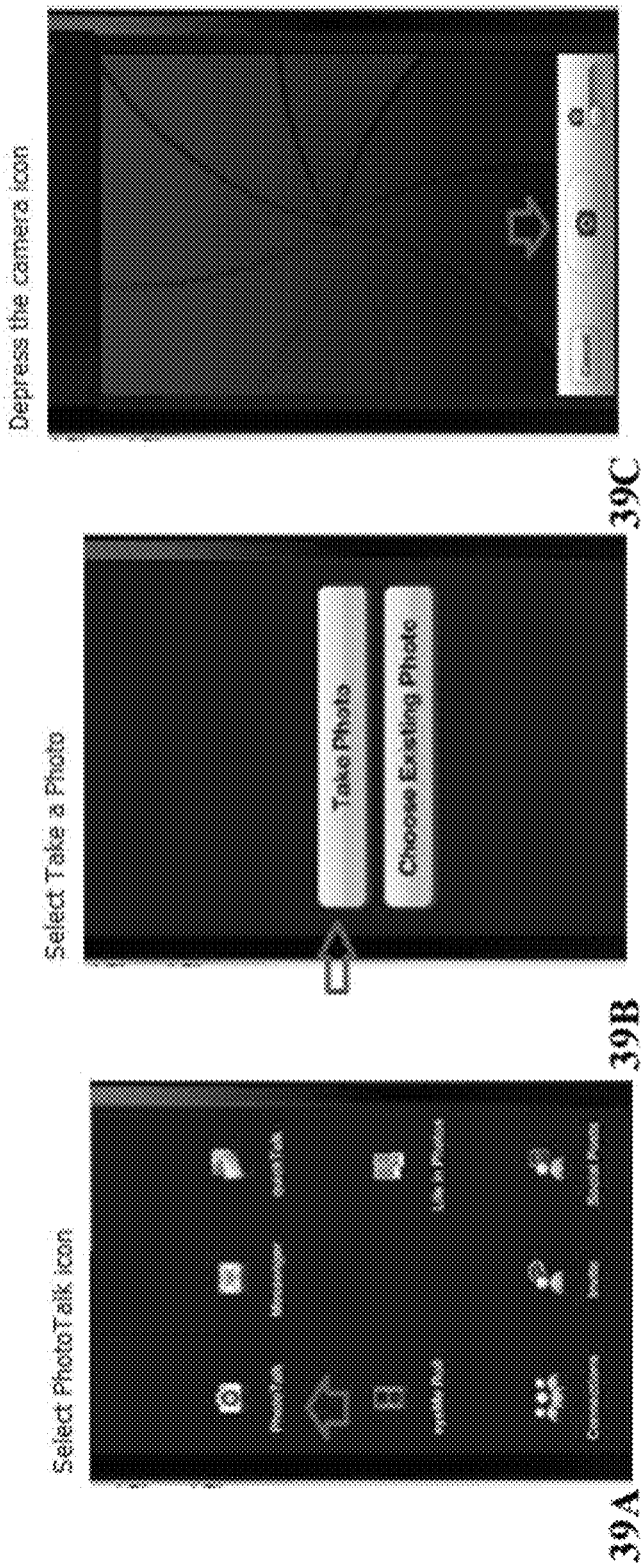
FIG. 38 is an illustration of a voice Social Post 218 for a social network or blog news feed enabled by the present invention.

FIG. 37 is an illustration a voice post to the Facebook social network 108 using the invention's social post feature 218. The capability to create and send voice posts using this aspect of the feature is accomplished through the current invention's a web-based content sharing and social network 106 consisting of servers, software application code, web methods and databases FIG. 1-104A & B FIG. 38 is an illustration a voice post to the Twitter social blogging site 108 using the invention's social post feature 218. The capability to create and send voice posts using this aspect of the feature is accomplished through the current invention's a web-based content sharing and social network 106 consisting of servers, software application code, web methods and databases FIG. 1-104A & B. FIG. 39 illustrates the steps a user will follow to use the Photo Talk invention that has been described in detail in the PhotoTalk process 210, FIG. 5 and FIG. 6.

While various embodiments have been described above, it should be understood that they have been presented by way of example only, and not limitation. For example, any of the elements associated with the computer implement systems and methods including the social network engine may employ any of the desired functionality set forth hereinabove. Thus, the breadth and scope of a preferred embodiment should not be limited by any of the above-described exemplary embodiments.

What is claimed is:

1. A computer implemented method for creating a multimedia file, the method comprising the steps of:
   obtaining, by a specially programmed computing system, a multimedia file that comprises one or more images;
   obtaining, by the specially programmed computing system, a digital element from a group consisting of: an audio content, a video content, and a text content;
   modifying, by the specially programmed computing system, the multimedia file by embedding the digital element within the multimedia file to create an embedded multimedia file;
   constructing, by the specially programmed computing system, a SOAP XML packet that comprises a SOAP header and a SOAP body, wherein the SOAP header indicates an application associated with the embedded multimedia file, and wherein the multimedia file and the digital element are located within the SOAP body;
   transmitting, by the specially programmed computing system, the SOAP XML packet over a network,
   receiving, by the specially programmed computing system, a second SOAP XML packet that comprises a second embedded multimedia file, wherein the second embedded multimedia file comprises a second multimedia file and a second digital element;

storing, by the specially programmed computing system, the second multimedia file and the second digital element received from the second SOAP XML packet using a file structure that corresponds to the structure of the second SOAP XML packet; and accessing, by the specially programmed computing system, the second embedded multimedia file such that the second multimedia file and the second digital element are concurrently launched together.

2. The method of claim 1, wherein the embedded multimedia file is uploadable to a digital media selected from the group consisting of: an email, a text, a SMS, and a social network.

3. A system comprising: a server, comprising:
a processor;
a storage system that stores a database comprising:
a multimedia file comprising at least one image; and
a digital element file, wherein the digital element file is at least one of the following: an audio file, a video file, and a text file; and
a computer program stored by the storage subsystem, when executed by the processor, causes the server to:
receive a SOAP XML packet that comprises the multimedia file and the digital element file, wherein the SOAP XML packet comprises a SOAP header and a SOAP body, wherein the SOAP header identifies an application corresponding to an embedded multimedia file, wherein the multimedia file and the digital element file are located within the SOAP body;
store the multimedia file and the digital element file into the database, wherein the multimedia file and the digital element file are stored in the database as a file structure based at least part on the structure of the SOAP XML packet;
receive an authentication request message that requests for an embedded multimedia file that comprises the multimedia file and the digital element file;
retrieve the multimedia file and the digital element file from the storage system in response to the authentication request;
associate the digital element file with the multimedia file based at least in part on the SOAP XML packet structure to create a second embedded multimedia file, wherein the second embedded multimedia file is adapted to simultaneously launch the digital element file and the multimedia file when accessing the second embedded multimedia file;
construct a second SOAP XML packet that comprises the second embedded multimedia file; and
transmit the second SOAP XML packet,
whereby the embedded multimedia file is created by modifying the multimedia file such that the digital element file is embedded within the multimedia file.

4. The method of claim 1, wherein the SOAP XML packet is transmitted via the network to a device selected from one of the following: a mobile device, a tablet device, a camera, and a video recorder.

5. The method of claim 1, wherein the second multimedia file and the second digital element are obtained using the file structure used to store the second multimedia file and the second digital element.

6. The method of claim 1, wherein accessing, by the specially programmed computing system, the second embedded multimedia file comprises a user clicking the second embedded multimedia file.

7. The method of claim 1, wherein the one or more images correspond to group consisting of: one or more photos, one or more videos, one or more multimedia digital books, and one or more digital slide shows.

8. The system of claim 3, wherein the embedded multimedia file is uploadable to a digital media selected from the group consisting of: an email, a text, a SMS, and a social network.

9. The system of claim 3, wherein the multimedia file and the digital element file are retrieved using the file structure that corresponds to the structure of the SOAP XML packet.

10. The system of claim 3, wherein the at least one image corresponds to at least one of the following: at least one photo, at least one video, at least one multimedia digital book, and at least one digital slide show.

11. An apparatus for creating an embedded multimedia file, comprising:
a processor coupled to a non-transitory computer-readable media, wherein the non-transitory computer-readable media comprises computer instructions, when executed by the processor, causes the apparatus to:
load a digital multimedia file that comprises at least one digital image on a user graphical interface;
access a digital element at least one of the following: an audio content, a video content, and a text content;
alter the multimedia file by attaching the digital element to the multimedia file to create an embedded multimedia file;
form a SOAP XML packet that comprises a SOAP header and a SOAP body, wherein the SOAP header identifies an application corresponding to the embedded multimedia file, and wherein the multimedia file and the digital element are located within the SOAP body;
transmit the SOAP XML packet;
receive a second SOAP XML packet that comprises a second embedded multimedia file, wherein the second embedded multimedia file comprises a second multimedia file and a second digital element; and
store the second embedded multimedia file received from the second SOAP XML packet using a file structure that corresponds to the structure of the second SOAP XML packet,
whereby the second embedded multimedia file is adapted such that the second multimedia file and the second digital element are concurrently launched together when launching the second embedded multimedia file.

12. The apparatus of claim 11, the computer instructions, when executed by the processor, further cause the apparatus to retrieve the second embedded multimedia file using the file structure that corresponds to the structure of the second SOAP XML packet.

13. The apparatus of claim 11, wherein the at least one digital image corresponds to at least one of the following: one or more photos, one or more videos, one or more multimedia digital books, and one or more digital slide shows.

* * * * *